United States Patent
Ito

(10) Patent No.: US 9,091,841 B2
(45) Date of Patent: Jul. 28, 2015

(54) ZOOMING OPTICAL SYSTEM, OPTICAL APPARATUS HAVING THE ZOOMING OPTICAL SYSTEM, AND METHOD FOR MANUFACTURING ZOOMING OPTICAL SYSTEM

(75) Inventor: Tomoki Ito, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/994,730

(22) PCT Filed: Dec. 14, 2011

(86) PCT No.: PCT/JP2011/078870
§ 371 (c)(1),
(2), (4) Date: Jun. 15, 2013

(87) PCT Pub. No.: WO2012/081602
PCT Pub. Date: Jun. 21, 2012

(65) Prior Publication Data
US 2013/0258495 A1    Oct. 3, 2013

(30) Foreign Application Priority Data

Dec. 15, 2010 (JP) .................................. 2010-278868
Dec. 15, 2010 (JP) .................................. 2010-278869
Dec. 22, 2010 (JP) .................................. 2010-285366
Dec. 22, 2010 (JP) .................................. 2010-285367

(51) Int. Cl.
*G02B 15/14* (2006.01)
*G02B 15/16* (2006.01)
(Continued)

(52) U.S. Cl.
CPC .............. *G02B 15/16* (2013.01); *G02B 15/173* (2013.01); *G02B 27/646* (2013.01); *Y10T 29/49826* (2015.01)

(58) Field of Classification Search
CPC ........ G02B 15/14; G02B 15/16; G02B 15/15; G02B 15/20; G02B 15/173
USPC .................................. 359/676, 679, 683–686
See application file for complete search history.

(56) References Cited

U.S. PATENT DOCUMENTS 8,339,712 B2    12/2012    Hayakawa
8,416,506 B2    4/2013     Ito
(Continued)

FOREIGN PATENT DOCUMENTS

JP      11-174325 A    7/1999
JP      11-223770 A    8/1999
(Continued)

OTHER PUBLICATIONS

English translation of International Preliminary Report on Patentability from International Application No. PCT/JP2011/078870, Jun. 18, 2013.

*Primary Examiner* — Scott J Sugarman
*Assistant Examiner* — Ephrem Mebrahtu
(74) *Attorney, Agent, or Firm* — Miles & Stockbridge P.C.

(57) ABSTRACT

A zoom optical system ZL to be mounted on an optical apparatus such as a single lens reflex camera 1, comprising, in order from an object side, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power. The zoom optical system is configured such that at least a portion of any one lens group among these lens group G1 to G6 may be moved such that a component in a direction perpendicular to the optical axis may be included. Thus, there are provided a zoom optical system that can suppress well variation in aberrations upon zooming, an optical apparatus equipped therewith and a method for manufacturing the zoom optical system.

22 Claims, 15 Drawing Sheets

(51) Int. Cl.
*G02B 15/173* (2006.01)
*G02B 27/64* (2006.01)

(56) References Cited

U.S. PATENT DOCUMENTS

| | | |
|---|---|---|
| 2010/0214658 A1 | 8/2010 | Ito |
| 2010/0214667 A1* | 8/2010 | Hayakawa .................... 359/683 |
| 2010/0321791 A1 | 12/2010 | Hayakawa |

FOREIGN PATENT DOCUMENTS

| | | |
|---|---|---|
| JP | 11-237552 A | 8/1999 |
| JP | 2000-047107 A | 2/2000 |
| JP | 2009-282214 A | 12/2009 |
| JP | 2010-191335 A | 9/2010 |

* cited by examiner

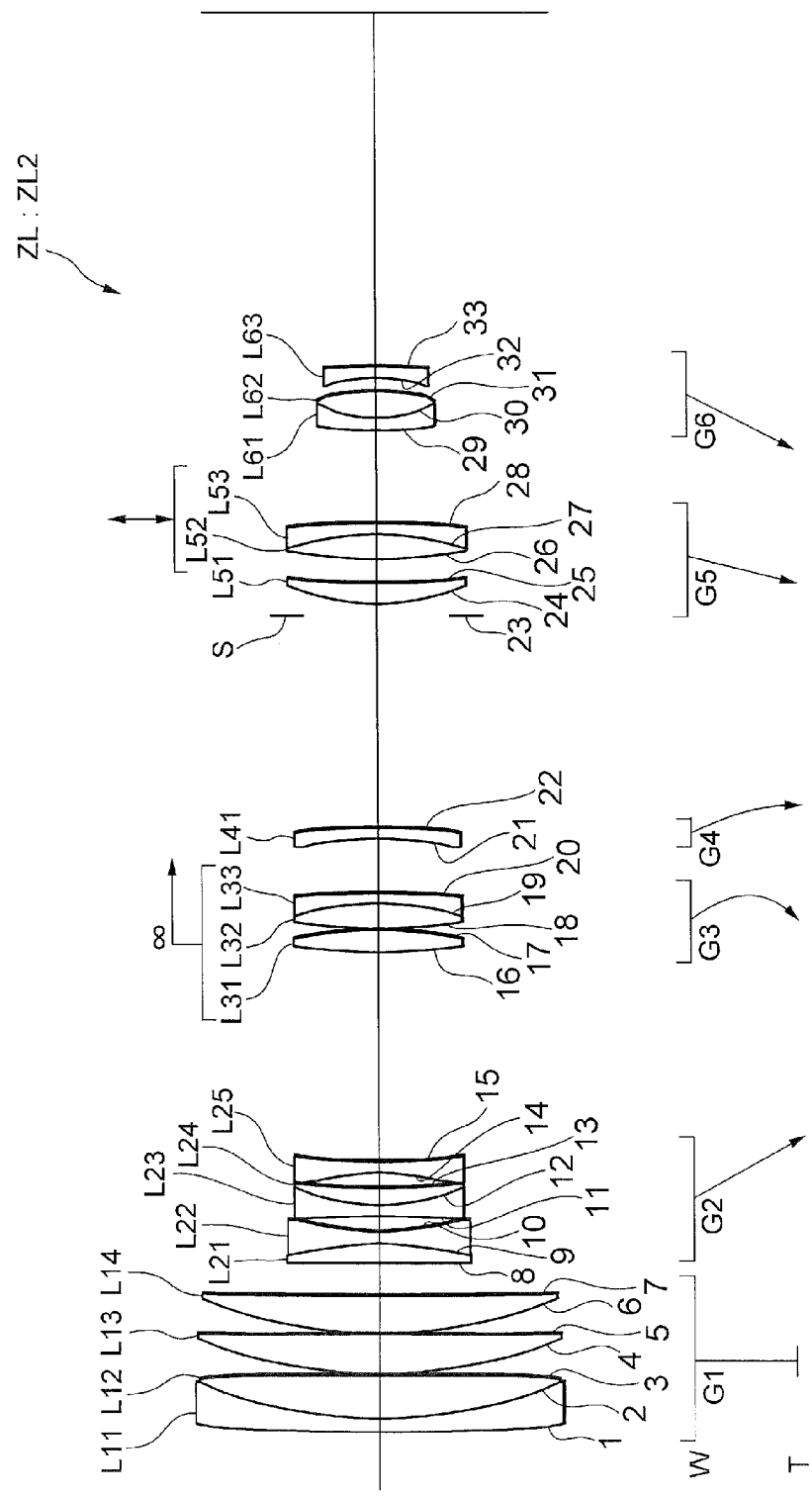

ZOOMING OPTICAL SYSTEM, OPTICAL APPARATUS HAVING THE ZOOMING OPTICAL SYSTEM, AND METHOD FOR MANUFACTURING ZOOMING OPTICAL SYSTEM

TECHNICAL FIELD

The present invention relates to a zooming optical system, an optical apparatus having the zooming optical system, and a method for manufacturing the zooming optical system.

BACKGROUND ART

There has been proposed a zooming optical system suitable for a phototaking camera, an electronic still camera, a video camera and the like (for example, refer to Japanese Patent Application Laid-Open No. 11-223770).

SUMMARY OF THE INVENTION

Problem to be Solved by the Invention

However, there has been a problem that a conventional zooming optical system has large variation in aberrations upon zooming.

Means for Solving the Problem

The present invention is made in view of the above-described problem, and has an object to provide a zooming optical system that is capable of suppressing well variations in aberrations upon zooming, an optical apparatus having the zooming optical system, and a method for manufacturing the zooming optical system.

According to a first aspect of the present invention, there is provided a zooming optical system comprising, in order from an object side: a first lens group having positive refractive power; a second lens group having negative refractive power; a third lens group having positive refractive power; a fourth lens group having negative refractive power; a fifth lens group having positive refractive power; and a sixth lens group having negative refractive power; at least a portion of any one lens group of those lens groups being so moved to have a component in a direction perpendicular to the optical axis. The zooming optical system satisfies the following conditional expressions (1) and (2):

$$1.62 < f1/f3 < 2.23 \qquad (1),$$

$$1.71 < (-f4)/f5 < 2.99 \qquad (2),$$

where f1 denotes a focal length of the first lens group, f3 denotes a focal length of the third lens group, f4 denotes a focal length of the fourth lens group, and f5 denotes a focal length of the fifth lens group.

According to a second aspect of the present invention, there is provided an optical apparatus having a zooming optical system according to a first aspect of the present invention.

According to a third aspect of the present invention, there is provided a zooming optical system comprising, in order from an object side: a first lens group having positive refractive power; a second lens group having negative refractive power; a third lens group having positive refractive power; a fourth lens group having negative refractive power; a fifth lens group having positive refractive power; and a sixth lens group having negative refractive power; the first lens group being fixed with respect to the image plane in the direction of the optical axis, upon zooming. The zooming optical system satisfies the following conditional expressions (5) and (6)

$$3.10 < f1/(-f2) < 5.00 \qquad (5),$$

$$0.40 < (-f2)/f3 < 0.60 \qquad (6),$$

where f1 denotes a focal length of the first lens group, f2 denotes a focal length of the second lens group, and f3 denotes a focal length of the third lens group.

According to a fourth aspect of the present invention, there is provided an optical apparatus having a zooming optical system according to the third aspect of the present invention.

According to a fifth aspect of the present invention, there is provided a method for manufacturing a zooming optical system comprising, in order from an object side: a first lens group having positive refractive power; a second lens group having negative refractive power; a third lens group having positive refractive power; a fourth lens group having negative refractive power; a fifth lens group having positive refractive power; and a sixth lens group having negative refractive power; the method comprising steps of disposing said lens groups such that at least a portion of any one lens group of those lens groups may be movable to have a component in a direction perpendicular to the optical axis, and that the zooming optical system satisfies the following conditional expressions (1) and (2)

$$1.62 < f1/f3 < 2.23 \qquad (1),$$

$$1.71 < (-f4)/f5 < 2.99 \qquad (2),$$

where f1 denotes a focal length of the first lens group, f3 denotes a focal length of the third lens group, f4 denotes a focal length of the fourth lens group, and f5 denotes a focal length of the fifth lens group.

Furthermore, according to a sixth aspect of the present invention, there is provided a method for manufacturing a zooming optical system comprising, in order from an object side; a first lens group having positive refractive power; a second lens group having negative refractive power; a third lens group having positive refractive power; a fourth lens group having negative refractive power; a fifth lens group having positive refractive power; and a sixth lens group having negative refractive power, said method comprising steps of disposing said lens groups such that, upon zooming, the first lens group is fixed with respect to the image plane in the direction of the optical axis, and the zooming optical system satisfies the following conditional expressions (5) and (6):

$$3.10 < f1/(-f2) < 5.00 \qquad (5),$$

$$0.40 < (-f2)/f3 < 0.60 \qquad (6),$$

where f1 denotes a focal length of the first lens group, f2 denotes a focal length of the second lens group, and f3 denotes a focal length of the third lens group.

Effect of the Invention

According to the present invention, there can be provided a zooming optical system that is capable of suppressing well variations in aberrations upon zooming, an optical apparatus having the zooming optical system, and a method for manufacturing the zooming optical system.

BRIEF DESCRIPTION OF THE DRAWINGS

FIGS. 2A and 2B are graphs showing various aberrations in a wide-angle end state of the zooming optical system relating to the first Example, in which FIG. 2A shows various aberrations upon focusing on infinity, and FIG. 2B shows coma at the time when correction of rotational camera shake of 0.3° is performed in a state focusing on infinity.

FIGS. 3A and 3B are graphs showing various aberrations in an intermediate focal length state of the zooming optical system of the first Example, in which FIG. 3A shows various aberrations upon focusing on infinity, and FIG. 3B shows coma at the time when correction of rotational camera shake of 0.2° is performed in a state focusing on infinity.

FIGS. 4A and 4B are graphs showing various aberrations in a telephoto end state of the zooming optical system relating to the first Example, in which FIG. 4A shows various aberrations upon focusing on infinity, and FIG. 4B shows coma at the time where correction of rotational camera shake of 0.2° is performed in a state focusing on infinity.

FIG. 5 is a sectional view showing a lens configuration of a zooming optical system relating to a second Example.

FIGS. 6A and 6B are graphs showing various aberrations in a wide-angle end state of the zooming optical system relating to the second Example, in which FIG. 6A shows various aberrations upon focusing on infinity, and FIG. 6B shows coma at the time when correction of rotational camera shake of 0.3° is performed in a state focusing on infinity.

FIGS. 7A and 7B are graphs showing various aberrations in an intermediate focal length state of the zooming optical system relating to the second Example, in which FIG. 7A shows various aberrations upon focusing on infinity, and FIG. 7B shows coma at the time when correction of rotational camera shake of 0.2° is performed in a state focusing on infinity.

FIGS. 8A and 8B are graphs showing various aberrations in a telephoto end state of the zooming optical system relating to the second Example, in which FIG. 8A shows various aberrations upon focusing on infinity, and FIG. 8B shows coma at the time when correction of rotational camera shake of 0.2° is performed in a state focusing on infinity.

FIGS. 10A and 10B are graphs showing various aberrations in a wide-angle end state of the zooming optical system relating to the third Example, in which FIG. 10A shows various aberrations upon focusing on infinity, and FIG. 10B shows coma at the time where correction of rotational camera shake of 0.3° is performed in a state focusing on infinity.

FIGS. 11A and 11B are graphs showing various aberrations in an intermediate focal length state of the zooming optical system relating to the third Example, in which FIG. 11A shows various aberrations upon focusing on infinity, and FIG. 11B shows coma at the time when correction of rotational camera shake of 0.2° is performed in a state focusing on infinity.

FIGS. 12A and 12B are graphs showing various aberrations in a telephoto end state of the zooming optical system relating to the third Example, in which FIG. 12A shows various aberrations upon focusing on infinity, and FIG. 12B shows coma at the time when correction of rotational camera shake of 0.2° is performed in a state focusing on infinity.

EMBODIMENT FOR CARRYING OUT THE INVENTION

Figure 1:
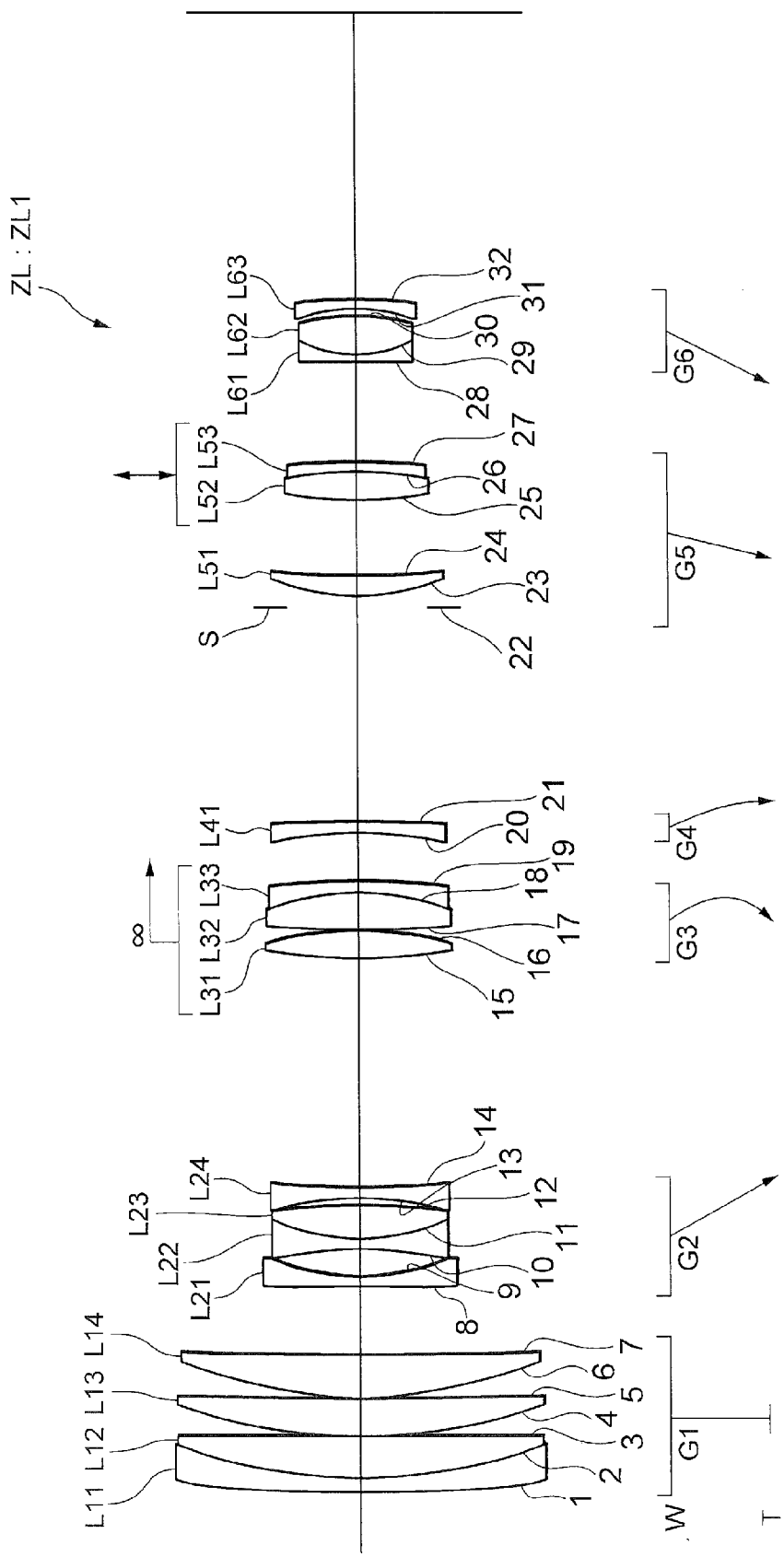
FIG. 1 is a sectional view showing a lens configuration of a zooming optical system according to a first Example.

A preferable embodiment according to the present invention is explained below with reference to accompanying drawings. As shown in FIG. 1, a zooming optical system ZL relating to the present embodiment comprises, in order from an object side, a first lens group G1 having positive refractive power; a second lens group G2 having negative refractive power; a third lens group G3 having positive refractive power; a fourth lens group G4 having negative refractive power; a fifth lens group G5 having positive refractive power; and a sixth lens group G6 having negative refractive power. This zooming optical system ZL is constructed such that at least a portion of any one lens group among the first to sixth lens groups G1 to G6 is moved to have a component perpendicular to the optical axis, thereby attaining a function for displacing an image as a vibration reduction lens group. By moving at least a portion of any one lens group among the first to sixth lens groups G1 to G6, it becomes possible to downsize a moving mechanism.

Further, the zooming optical system ZL is constructed such that, upon zooming, each distance between the adjacent two of the first to sixth lens groups G1 to G6, is varied (in other words, a distance between the first lens group G1 and the second lens group G2 is varied, a distance between the second lens group G2 and the third lens group G3 is varied, a distance between the third lens group G3 and the fourth lens group G4 is varied, and a distance between the fourth lens group G4 and the fifth lens group G5 is varied, and a distance between the fifth lens group G5 and the sixth lens group G6 is varied). It is possible to make variation in spherical aberration and variation in curvature of field small, upon zooming.

In this zoom optical system ZL, the first lens group G1 is fixed with respect to an image plane in the direction of the optical axis, upon zooming. By fixing the first lens group G1 with respect to an image plane in the direction of the optical axis, a driving mechanism for zooming may be simplified, and thereby a lens barrel being downsized.

Next, the conditions for constructing the zoom lens system ZL are explained. At first, the zoom optical system ZL relating to the present embodiment is characterized in satisfying the following conditional expression (1):

$$1.62 < f1/f3 < 2.23 \qquad (1),$$

where f1 denotes a focal length of the first lens group G1, and f3 denotes a focal length of the third lens group G3.

The conditional expression (1) defines a proper focal length of the first lens group G1 relative to a focal length of the third lens group G3. It is possible to correct well spherical aberration and chromatic aberration at a telephoto end by satisfying the conditional expression (1).

When the value of f1/f3 falls below the lower limit value of the conditional expression (1), refractive power of the first lens group G1 becomes large, and correction of spherical aberration and correction of chromatic aberration at a telephoto end become difficult, so that it is not preferable. In order to secure the advantageous effect of the present embodiment, it is preferable to set the lower limit value of the conditional expression (1) to 1.70.

When the value of f1/f3 exceeds the upper limit value of the conditional expression (1), refractive power of the first lens group G1 becomes weak. Accordingly, it makes the entire length of the zoom optical system large. Further, refractive power of the third lens group G3 becomes large, and it becomes difficult to correct spherical aberration in a telephoto end, so that it is not desirable. In order to secure the advantageous effect of the present embodiment, it is preferable to set the upper limit value of the conditional expression (1) to 2.20.

Further, it is preferable that the present zoom optical system ZL satisfies the following conditional expression (2)

$$1.71<(-f4)/f5<2.99 \quad (2),$$

where f4 denotes a focal length of the fourth lens group G4, and f5 denotes a focal length of the fifth lens group G5.

The conditional expression (2) defines a proper focal length of the fourth lens group G4 with respect to the focal length of the fifth lens group G5. It is possible to correct well variation in spherical aberration upon zooming by satisfying the conditional expression (2).

When the value of (−f4)/f5 falls below the lower limit value of the conditional expression (2), the refractive power of the fourth lens group G4 becomes strong, and generation of eccentric coma due to manufacturing error becomes outstanding, so that it is not preferable. In order to attain the effect of the present embodiment surely, it is preferable to set the lower limit value of the conditional expression (2) to 1.90.

On the other hand, when the value of (−f4)/f5 exceeds the upper limit value of the conditional expression (2), refractive power of the fourth lens group G4 becomes weak. Accordingly, it becomes difficult to correct variation in spherical aberration upon zooming, so that it is undesirable In order to attain the effect of the present embodiment surely, it is preferable to set the upper limit value of the conditional expression (2) to 2.85.

Thus, by configuring to satisfy the conditional expression (1) or the conditional expression (2), the zoom optical system ZL relating to the present embodiment can realize a zooming optical system that can suppress well variations in aberrations upon zooming and variations in aberrations upon correcting image blur.

Further, it is preferable that the present zooming optical system ZL satisfies the following conditional expression (3):

$$0.30<f1/TLw<0.60 \quad (3),$$

where TLw denotes the total length of the present zooming optical system ZL in the wide angle end state (that is, the length of the most object side lens surface of the present zooming optical system ZL to the image plane thereof).

The conditional expression (3) defines a proper focal length of the first lens group G1 with respect to the total optical length of the present zooming optical system ZL in the wide angle end state thereof. The present zooming optical system ZL can correct well spherical aberration and chromatic aberration in the telephoto end state by satisfying the conditional expression (3).

When the value of f1/TLw falls below the lower limit value of the conditional expression (3), the refractive power of the first lens group G1 becomes strong, and it becomes difficult to correct spherical aberration and chromatic aberration in the telephoto end state. Incidentally, in order to attain the effect of the present embodiment surely, it is preferable to set the lower limit value of the conditional expression (3) to 0.35.

Further, when the value of f1/TLw exceeds the upper limit value of the conditional expression (3), the total optical length with respect to the first lens group G1 becomes small, and it becomes difficult to correct the curvature of field in the wide angle end state, so that it is not preferable. In order to attain the effect of the present embodiment surely, it is preferable to set the upper limit value of the conditional expression (3) to 0.52.

Further, it is preferable that the present zooming optical system satisfies the following expression (4):

$$0.08<(-f2)/TLw<0.15 \quad (4),$$

where f2 denotes a focal length of the second lens group G2.

The conditional expression (4) defines a proper focal length of the second lens group G2 with respect to the total optical length of the present zooming optical system ZL in the wide angle end state thereof. The present zooming optical system can correct well coma in the wide angle end state and spherical aberration in the telephoto end state by satisfying the conditional expression (4).

When the value of (−f2)/TLw falls below the lower limit value of the conditional expression (4), the refractive power of the second lens group G2 becomes strong, and it becomes difficult to correct coma in the wide angle end state and spherical aberration in the telephoto end state, so that it is not preferable. In order to attain the effect of the present embodiment surely, it is preferable to set the lower limit value of the conditional expression (4) to 0.09.

Further, when the value of (−f2)/TLw exceeds the upper limit value of the conditional expression (4), the refractive power of the second lens group G2 becomes small, and the diameter of the first lens group G1 becomes large, so that it is not preferable. In order to attain the effect of the present embodiment surely, it is preferable to set the upper limit value of the conditional expression (4) to 0.14.

Further, it is preferable that the zoom optical system ZL relating to the present embodiment has an aperture stop S disposed between the third lens group G3 and the sixth lens group G6 (that is, disposed between a lens group and a lens group, or within a lens group). By such a configuration, coma and curvature of field can be corrected well.

Further, it is preferable that in the zoom optical system ZL relating to the present embodiment, at least a portion of the third lens group G3 is moved along the optical axis, upon focusing. It is more preferable that all lenses of the third lens group are moved to object side along the optical axis upon focusing. By such a configuration, speedy focusing can be carried out, and moreover it is possible to make variation in spherical aberration upon focusing, small.

Figure 14:
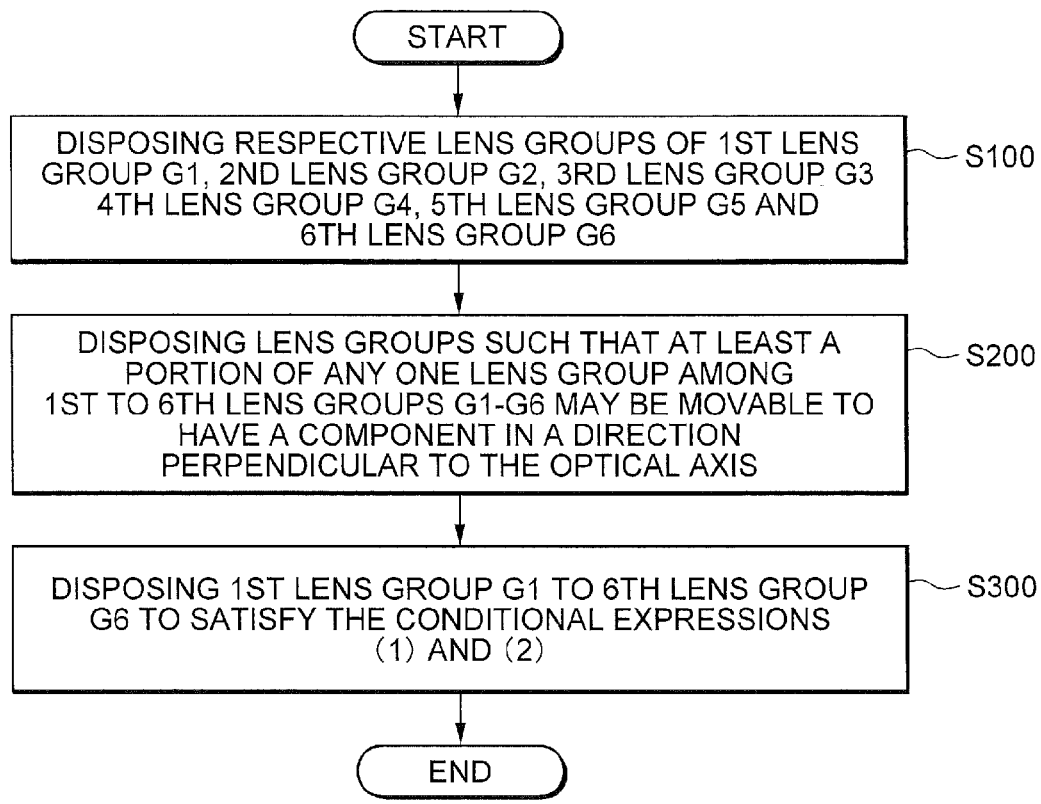
FIG. 14 is a flowchart schematically showing a method for manufacturing the zooming optical system relating to the present embodiment.

Hereinafter, an outline of a method for manufacturing a zoom optical system ZL according the present embodiment is explained with reference to FIG. 14.

(Step 100) At first, each lens is disposed to prepare each lens group. Concretely, according to the present embodiment, as shown in FIG. 1, for example, in order from an object side, a cemented negative lens constructed by a negative meniscus lens L11 having a convex surface facing the object side cemented with a double convex lens L12, a positive meniscus lens L13 having a convex surface facing the object side and a positive meniscus lens L14 having a convex surface facing the object side are arranged to form a first lens group G1; in order from the object side, a negative meniscus lens L21 having a convex surface facing the object side, a cemented positive lens constructed by a double concave lens L22 cemented with a double convex lens L23, and a double concave lens L24 are arranged to form a second lens group G2; in order from the object side, a double convex lens L31 and a cemented negative lens constructed by a double convex lens L32 cemented with a negative meniscus lens L33 having a concave surface facing the object side, are arranged to form a third lens group G3; a negative meniscus lens L41 having a concave surface facing the object side is arranged to form a fourth lens group G4; in order from the object side, an aperture stop S, a positive meniscus lens L51 having a convex surface facing the object side and a cemented positive lens constructed by a double convex lens L52 cemented with a negative meniscus lens L53 having a concave surface facing the object side are arranged to form a fifth lens group G5; and in order from an object side, a cemented positive lens constructed by double concave lens L61 cemented with a double convex lens L62 and a negative meniscus lens L63 having a concave surface facing the object side are arranged to form a sixth lens group G6.

(Step 200) At this time, the arrangement is so made that at least a portion of any one lens group among those lens groups G1 to G6 (in the case of FIG. 1, a portion in the fifth lens group G5) may be movable in a direction including a component perpendicular to the optical axis.

(Step 300) And, these lens groups G1 to G6 are so arranged to satisfy the above conditional expressions (1) and (2), where f1 denotes a focal length of the first lens group G1, f3 denotes a focal length of the third lens group G3, f4 denotes a focal length of the fourth lens group G4, and f5 denotes a focal length of the fifth lens group G5.

Next, a zooming optical system ZL in another point of view according to the present embodiment comprises, in order from an object side, a first lens group G1 having positive refractive power; a second lens group G2 having negative refractive power; a third lens group G3 having positive refractive power; a fourth lens group G4 having negative refractive power; a fifth lens group G5 having positive refractive power; and a sixth lens group G6 having negative refractive power. In this zoom optical system ZL in the another point of view according to the present embodiment, the first lens group G1 is fixed with respect to an image plane in the direction of the optical axis, upon zooming. By fixing the first lens group G1 with respect to the image plane in the direction of the optical axis, a driving mechanism for zooming may be simplified, thereby a lens barrel being downsized.

Further, in the zooming optical system ZL in the another point of view according to the present embodiment, it is preferable that, upon zooming, each distance between the adjacent two of the first to sixth lens groups G1 to G6, is varied (in other words, a distance between the first lens group G1 and the second lens group G2 is varied, a distance between the second lens group G2 and the third lens group G3 is varied, a distance between the third lens group G3 and the fourth lens group G4 is varied, a distance between the fourth lens group G4 and the fifth lens group G5 is varied, and a distance between the fifth lens group G5 and the sixth lens group G6 is varied). By such a configuration, it becomes possible to make variation in spherical aberration and variation in curvature of field small, upon zooming.

Further, in the zooming optical system ZL in the another point of view according to the present embodiment, at least a portion of any one lens group among the above first to sixth lens groups G1 to G6 is configured to have a function as a vibration reduction lens by being moved such that a component in a direction perpendicular to the optical axis may be included. By moving a portion of the lens group like this, a moving mechanism can be downsized.

Next, explanation is made with respect to the conditions for constructing the zoom optical system ZL in the another point of view according to the present embodiment.

Firstly, the zoom optical system ZL in the another point of view relating to the present embodiment satisfies the following conditional expression (5):

$$3.10 < f1/(-f2) < 5.00 \quad (5),$$

where f1 denotes a focal length of the first lens group G1, and f2 denotes a focal length of the second lens group G2.

The conditional expression (5) defines a proper focal length of the first lens group G1 with respect to a focal length of the second lens group G2. It is possible to correct well spherical aberration and chromatic aberration in a telephoto end state by satisfying the conditional expression (5).

When the value of f1/(−f2) falls below the lower limit value of the conditional expression (5), refractive power of the first lens group G1 becomes strong, and correction of spherical aberration and correction of chromatic aberration in the telephoto end state become difficult, so that it is not preferable. In order to secure the advantageous effect of the present embodiment, it is preferable to set the lower limit value of the conditional expression (5) to 3.40.

When the value of f1/(−f2) exceeds the upper limit value of the conditional expression (5), refractive power of the first lens group G1 becomes weak. Accordingly, it makes the total length of the zoom optical system large, so that it is not desirable. In order to secure the advantageous effect of the present embodiment, it is preferable to set the upper limit value of the conditional expression (5) to 4.50.

Further, it is preferable that the present zoom optical system ZL in the another point of view relating to the present embodiment satisfies the following conditional expression (6):

$$0.40 < (-f2)/f3 < 0.60 \quad (6),$$

where f3 denotes a focal length of the third lens group G3.

The conditional expression (6) defines a proper focal length of the second lens group G2 with respect to the focal length of the third lens group G3. It is possible to correct well coma in the wide angle end state and spherical aberration in the telephoto end state by satisfying the conditional expression (6).

When the value of (−f2)/f3 falls below the lower limit value of the conditional expression (6), refractive power of the second lens group G2 becomes strong, and correction of coma in the wide angle end state and correction of spherical aberration in the telephoto end state become difficult, so that it is not preferable. In order to attain the effect of the present embodiment surely, it is preferable to set the lower limit value of the conditional expression (6) to 0.42.

On the other hand, when the value of (−f2)/f3 exceeds the upper limit value of the conditional expression (6), the refractive power of the second lens group G2 becomes weak, and the diameter of the first lens group G1 becomes large, so that it is undesirable. In order to attain the effect of the present embodiment surely, it is preferable to set the upper limit value of the conditional expression (6) to 0.55.

Thus, the zoom optical system ZL in the another point of view relating to the present embodiment can realize a zoom optical system that can suppress well variations in aberrations upon zooming and variations in aberrations upon correcting image blur.

Further, it is preferable that the present zoom optical system ZL in the another point of view relating to the present embodiment satisfies the following expression (7):

$$2.00 < f4/f6 < 3.00 \quad (7),$$

where f4 denotes a focal length of the fourth lens group G4, and f6 denotes a focal length of the sixth lens group G6.

The conditional expression (7) defines a proper focal length of the sixth lens group G6 with respect to a focal length of the fourth lens group G4. It is possible to correct well spherical aberration upon zooming by satisfying the conditional expression (7).

When the value of f4/f6 falls below the lower limit value of the conditional expression (7), the refractive power of the fourth lens group G4 becomes strong, and generation of eccentric coma due to manufacturing error becomes outstanding, so it is not desirable. Incidentally, in order to attain the effect of the present embodiment surely, it is preferable to set the lower limit value of the conditional expression (7) to 2.20.

Further, when the value of f4/f6 exceeds the upper limit value of the conditional expression (7), the refractive power of the fourth lens group G4 becomes weak, and it becomes difficult to correct variation in the spherical aberration upon zooming, so that it is not preferable. In order to attain the effect of the present embodiment surely, it is preferable to set the upper limit value of the conditional expression (7) to 2.80.

Further, it is preferable that the present zoom optical system ZL in the another point of view relating to the present embodiment satisfies the following expression (8):

$$0.66 < f5/(-f6) < 1.50 \qquad (8),$$

where f5 denotes a focal length of the fifth lens group G5, and f6 denotes a focal length of the sixth lens group G6.

The conditional expression (8) defines a proper focal length of the fifth lens group G5 with respect to a focal length of the sixth lens group G6. The present zoom optical system ZL can correct well variation in curvature of field upon zooming by satisfying the conditional expression (8).

When the value of f5/(-f6) falls below the lower limit value of the conditional expression (8), the ref-active power of the fifth lens group G5 becomes strong, and it becomes difficult to correct the curvature of field and astigmatism in the wide angle end state, so that it is not preferable. In order to attain the effect of the present embodiment surely, it is preferable to set the lower limit value of the conditional expression (8) to 0.80.

Further, when the value of f5/(-f6) exceeds the upper limit value of the conditional expression (8), the refractive power of the fifth lens group G5 becomes weak, and it becomes difficult to correct variation in the curvature of field upon zooming, so that it is not preferable. In order to attain the effect of the present embodiment surely, it is preferable to set the upper limit value of the conditional expression (8) to 1.30.

Further, it is preferable that the zooming optical system ZL in the another point of view relating to the present embodiment has an aperture stop S disposed between the third lens group G3 and the sixth lens group G6 (that is, disposed between a lens group and a lens group, or within a lens group). By such a configuration, coma and curvature of field can be corrected well.

Further, it is preferable that in the zoom optical system ZL in the another point of view relating to the present embodiment at least a portion of the third lens group G3 is moved to the object side along the optical axis upon focusing. It is more preferable that all lenses of the third lens group G3 are moved to object side along the optical axis upon focusing. By such a configuration, focusing can become conducted speedy, and moreover it is possible to make variation in spherical aberration upon focusing, small.

Figure 15:
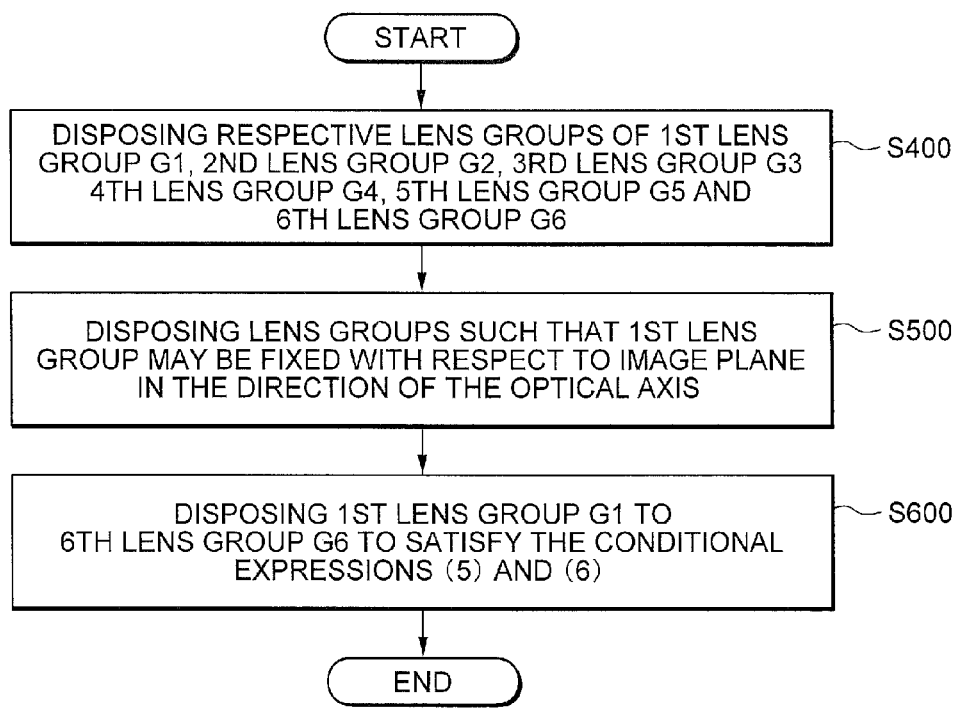
FIG. 15 is a flowchart schematically showing a method for manufacturing the zooming optical system in view of another point of the present embodiment.

Hereinafter, an outline of a method for manufacturing a zoom optical system ZL in the another point of view relating to the present embodiment is explained with reference to FIG. 15.

(Step 400) At first, each lens is disposed to prepare each lens group. Concretely, according to the present embodiment, as shown in FIG. 1, for example, in order from an object side, a cemented negative lens constructed by a negative meniscus lens L11 having a convex surface facing the object side cemented with a double convex lens L12, a positive meniscus lens L13 having a convex surface facing the object side, and a positive meniscus lens L14 having a convex surface facing the object side are arranged to form a first lens group G1; in order from the object side, a negative meniscus lens L21 having a convex surface facing the object side, a cemented positive lens constructed by a double concave lens L22 cemented with a double convex lens L23, and a double concave lens L24 are arranged to form a second lens group G2; in order from the object side, a double convex lens L31 and a cemented negative lens constructed by a double convex lens L32 cemented with a negative meniscus lens L33 having a concave surface facing the object side, are arranged to form a third lens group G3; a negative meniscus lens L41 having a concave surface facing the object side is arranged to form a fourth lens group G4; in order from the object side, an aperture stop S, a positive meniscus lens L51 having a convex surface facing the object side and a cemented positive lens constructed by a double convex lens L52 cemented with a negative meniscus lens L53 having a concave surface facing the object side are arranged to form a fifth lens group G5; and in order from the object side, a cemented positive lens constructed by a double concave lens L61 cemented with a double convex lens L62, and a negative meniscus lens L63 having a concave surface facing the object side are arranged to form a sixth lens group G6.

(Step 500) At this time the first lens group G1 is disposed to be fixed with respect to the image plane in the direction of the optical axis.

(Step 600) And, these lens groups G1 to G6 are disposed to satisfy the above conditional expressions (5) and (6), where f1 denotes a focal length of the first lens group G1, f2 denotes a focal length of the second lens group G2, and f3 denotes a focal length of the third lens group G3.

EXAMPLES

Figure 9:
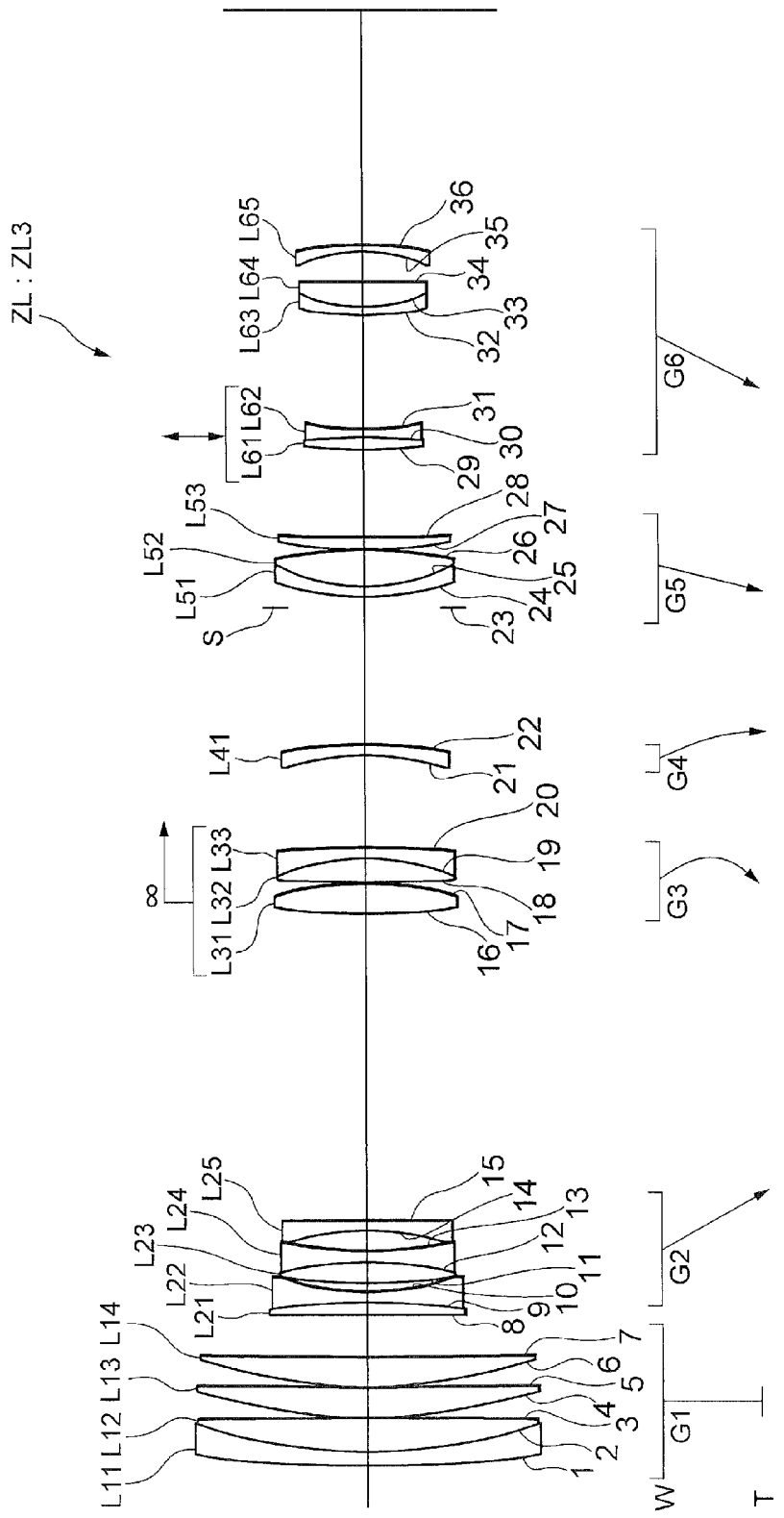
FIG. 9 is a sectional view showing a zooming optical system relating to a third Example.

Next, the respective examples of the present application are explained with reference to the accompanying drawings. FIG. 1, FIG. 5 and FIG. 9 show cross-sections of the respective zoom optical systems ZL (ZL1 to ZL3) as the examples of the present application.

These zoom optical systems ZL1 to ZL3 each is composed of, in order from an object side, a first lens group G1 having positive refractive power, a second lens group G2 having negative refractive power, a third lens group G3 having positive refractive power, a fourth lens group G4 having negative refractive power, a fifth lens group G5 having positive refractive power and a sixth lens group G6 having negative refractive power.

Arrows occurred under the cross sectional views of the respective zooming optical systems ZL1 to ZL3 show a moving direction of each of the lens groups G1 to G6 along the optical axis upon zooming from the wide angle end state (W) to the telephoto end state (T). Concretely, the first lens group G1 is fixed with respect to the image plane in the direction of the optical axis, the second lens group G2 is moved to the image plane side, the third lens group G3 is once moved to the image plane side and then moved to the object side, the fourth lens group G4 is once moved to the image plane side and then moved to the object side, the fifth lens group G5 is moved to the object side and the sixth lens group G6 is moved to the object side, such that an on-axis air space between the first lens group G1 and the second lens group G2 may be increased, an on-axis air space between the second lens group G2 and the third lens group G3 is varied, an on-axis air space between the third lens group G3 and the fourth lens group G4 is varied, and an on-axis air space between the fourth lens group G4 and the fifth lens group G5 is decreased, and an on-axis air space between the fifth lens group G5 and the sixth lens group G6 is increased.

In these zoom optical systems ZL1 to ZL3, the third lens group G3 is moved from the object side to the image plane side, upon focusing from an infinite object to a most close object. In the zoom optical systems ZL1 and ZL2 relating to the first and the second Examples, a portion of the fifth lens group G5 is moved as a vibration reduction lens group such that a component in a direction perpendicular to the optical axis may be included. In the zooming optical system ZL3 relating to the third Example, a portion of the sixth lens group G6 is moved as a vibration reduction lens group such that a component in a direction perpendicular to the optical axis may be included.

First Example

FIG. 1 shows a lens configuration of the zoom optical system ZL1 relating to the first Example. In the zoom optical system ZL1 shown in FIG. 1, the first lens group G1 is composed of, in order from the object side, a cemented negative lens constructed by a negative meniscus lens L11 having a convex surface facing the object side cemented with a double convex lens L12, a positive meniscus lens L13 having a convex surface facing the object side, and a positive meniscus lens L14 having a convex surface facing the object side.

The second lens group G2 is composed of, in order from the object side, a negative meniscus lens L21 having a convex surface facing the object side, a cemented positive lens constructed by a double concave lens L22 cemented with a double convex lens L23 and a double concave lens L24.

The third lens group G3 is composed of, in order from the object side, a double convex lens L31 and a cemented negative lens constructed by a double convex lens L32 cemented with a negative meniscus lens L33 having a concave surface facing the object side.

The fourth lens group G4 is composed of a negative meniscus lens L41 having a concave surface facing the object side.

The fifth lens group G5 is composed of, in order from the object side, an aperture stop S, a positive meniscus lens L51 having a convex surface facing the object side, a cemented positive lens constructed by a double convex lens L52 cemented with a negative meniscus lens L53 having a concave surface facing to the object side.

The sixth lens group G6 is composed of, in order from the object side, a cemented positive lens constructed by a double concave lens L61 cemented with a double convex lens L62 and a negative meniscus lens L63 having a concave surface facing to the object side.

Various values associated with the first Example are listed in Table 1 below.

In (Entire Specifications) of Table 1, a focal length f, an f-number FNO, an angle of view 2ω, an image height Y and a total lens length TL are shown in each of a wide-angle end state W, an intermediate focal length state M and a telephoto end state T.

In (Lens Data), the first column "m" shows order of lens surface (lens surface number) from the object side along the direction in which light rays advance, the second column "r" shows radius of curvature of each lens surface, the third column "d" shows a distance along the optical axis from a lens surface to the next lens surface (surface-to-surface distance), the fourth column "υd" and the fifth column "nd" show respectively Abbe-number and refractive index of the material at d-line(wave length λ=587.6 nm). The total length "TL" denotes a distance along the optical axis from the first surface of the lens surfaces upon focusing on infinity to the image plane.

Further, in order to correct rotational camera shake of an angle θ in the present zoom optical system ZL1, in which a focal length of the entire system is f and whose vibration reduction coefficient, that is, a ratio of a moving amount of an image at the image plane with respect to a moving amount of a moving lens group (vibration reduction lens group) is K, the vibration reduction lens group for correcting camera shake may be moved by (f·tan θ)/K in a direction perpendicular to the optical axis (this is the same with respect to the embodiments described hereinafter).

In (Vibration Reduction Data), there are shown focal length "f", vibration reduction coefficient "K", rotational camera shake "θ" (unit: degree) and moving amount "Dvr" (unit: "mm") of vibration reduction lens group in the wide angle end state "W", intermediate focal length state "M" and telephoto end state "T" in the zoom optical system ZL1 relating to the first Example.

In (Lens Group Data), a starting surface "ST" and a focal length of each of the first to sixth lens groups G1 to G6 are shown.

In the following all various values, "mm" is generally used for the unit of length such as the focal length "f", the radius of curvature "r" and the distance "d" from a surface to the next lens surface. However, since similar optical performance can be obtained by an optical system proportionally enlarged or reduced its dimension, the unit is not necessarily to be limited to "mm". Radius of curvature 0.00 shows a plane in the case of lens surface and shows an aperture or stop surface in the case of an aperture stop. Refractive index 1.00000 of air is omitted. The explanations of these reference signs and the explanations of various values in the Table are the same in the Examples below.

TABLE 1

| (Entire Specifications) | | | |
|---|---|---|---|
| | W | M | T |
| f = | 81.6 | 240.0 | 392.0 |
| FNO = | 4.59 | 5.00 | 5.77 |
| 2ω = | 29.4 | 9.9 | 6.1 |
| Y = | 21.6 | 21.6 | 21.6 |
| TL = | 272.2 | 272.2 | 272.2 |

| (Lens Data) | | | | |
|---|---|---|---|---|
| m | r | d | νd | nd |
| 1 | 296.532 | 2.500 | 32.35 | 1.85026 |
| 2 | 99.157 | 7.768 | 82.51 | 1.49782 |
| 3 | −5648.049 | 0.100 | | |
| 4 | 107.361 | 6.853 | 82.51 | 1.49782 |
| 5 | 1442.619 | 0.100 | | |
| 6 | 87.207 | 7.958 | 82.51 | 1.49782 |
| 7 | 1442.621 | D1 | | |
| 8 | 1295.063 | 2.000 | 46.62 | 1.81600 |
| 9 | 43.784 | 5.132 | | |
| 10 | −72.122 | 2.000 | 65.46 | 1.60300 |
| 11 | 40.058 | 6.018 | 23.78 | 1.84666 |
| 12 | −127.005 | 1.379 | | |
| 13 | −58.482 | 2.000 | 42.72 | 1.83481 |
| 14 | 184.347 | D2 | | |
| 15 | 110.569 | 5.196 | 53.87 | 1.71300 |
| 16 | −65.335 | 0.200 | | |
| 17 | 280.819 | 6.998 | 82.51 | 1.49782 |
| 18 | −46.060 | 1.800 | 29.37 | 1.95000 |
| 19 | −129.313 | D3 | | |
| 20 | −80.102 | 2.000 | 60.09 | 1.64000 |
| 21 | −422.530 | D4 | | |
| 22 | 0.000 | 2.000 | | Aperture stop S |
| 23 | 44.633 | 3.987 | 82.51 | 1.49782 |
| 24 | 224.471 | 13.809 | | |
| 25 | 71.214 | 5.405 | 52.30 | 1.51742 |

TABLE 1-continued

| 26 | −74.260  | 1.500 | 23.78 | 1.84666 |
|----|----------|-------|-------|---------|
| 27 | −191.536 | D5    |       |         |
| 28 | −997.616 | 1.500 | 40.76 | 1.88300 |
| 29 | 24.061   | 7.006 | 33.80 | 1.64769 |
| 30 | −45.482  | 1.665 |       |         |
| 31 | −29.745  | 1.500 | 46.62 | 1.81600 |
| 32 | −102.450 | BF    |       |         |

(Lens Group Data)

| Lens Group | ST | focusing distance |
|------------|----|-------------------|
| G1 | 1  | 111.246  |
| G2 | 8  | −28.407  |
| G3 | 15 | 60.186   |
| G4 | 20 | −154.790 |
| G5 | 22 | 66.241   |
| G6 | 28 | −63.117  |

(Variable Distance Data)

|    | W      | M      | T      |
|----|--------|--------|--------|
| D1 | 12.385 | 45.589 | 51.052 |
| D2 | 42.241 | 16.728 | 2.000  |
| D3 | 8.980  | 19.588 | 17.980 |
| D4 | 39.432 | 11.781 | 2.000  |
| D5 | 18.379 | 18.556 | 19.067 |
| BF | 52.4   | 61.6   | 81.7   |

(Vibration Reduction Data)

|   | f     | K    | θ   | Dvr  |
|---|-------|------|-----|------|
| W | 81.6  | 0.76 | 0.3 | 0.56 |
| M | 240.0 | 0.86 | 0.2 | 0.98 |
| T | 392.0 | 1.07 | 0.2 | 1.28 |

(Values for Conditional Expressions)

(1) f1/f3 = 1.85
(2) (−f4)/f5 = 2.34
(3) f1/TLw = 0.41
(4) f2/TLw = 0.10
(5) f1/(−f2) = 3.92
(6) (−f2)/f3 = 0.47
(7) f4/f6 = 2.45
(8) f5/(−f6) = 1.05

Figure 2A:
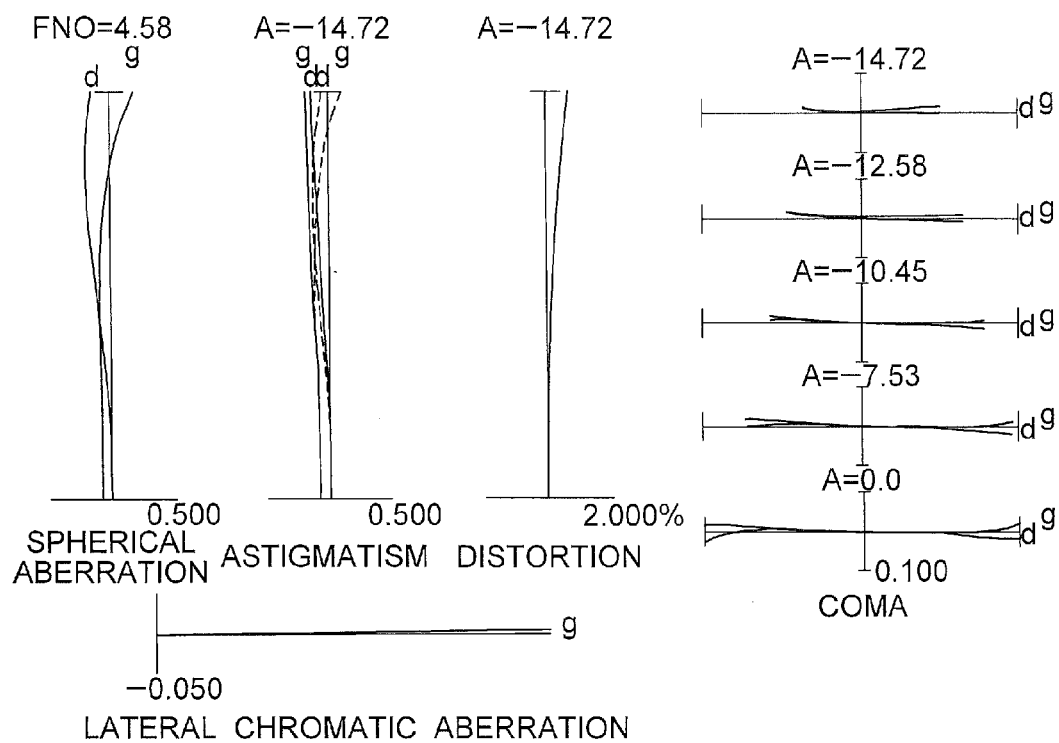
Figure 2B:
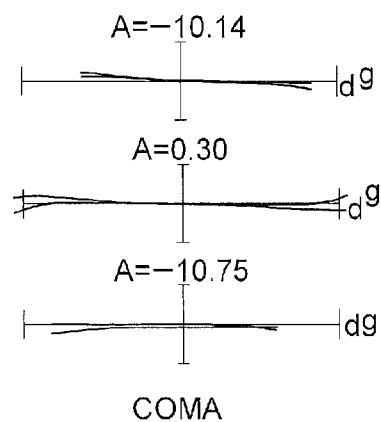

FIGS. 2A and 2B are graphs showing various aberrations of the zooming optical system relating to the first Example in a wide angle end state, in which FIG. 2A shows various aberrations upon focusing on infinity, and FIG. 2B shows coma upon carrying out correction of rotational camera shake of 0.3° in a state focusing on infinity.

Figure 3A:
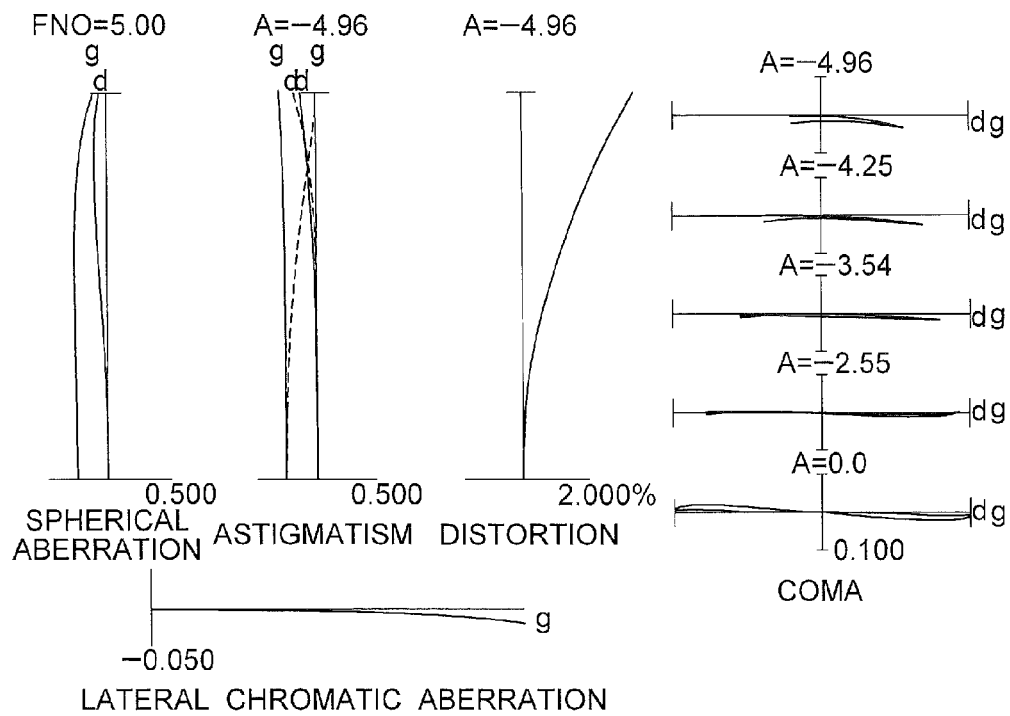
Figure 3B:
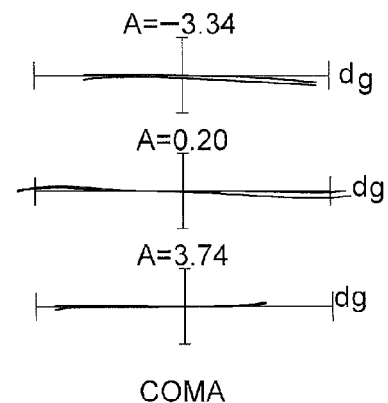

FIGS. 3A and 3B are graphs showing various aberrations of the zooming optical system according to the first Example in an intermediate focal length state, in which FIG. 3A shows various aberrations upon focusing on infinity and FIG. 3B shows coma upon carrying out correction of rotational camera shake of 0.2° in a state focusing on infinity.

Figure 4A:
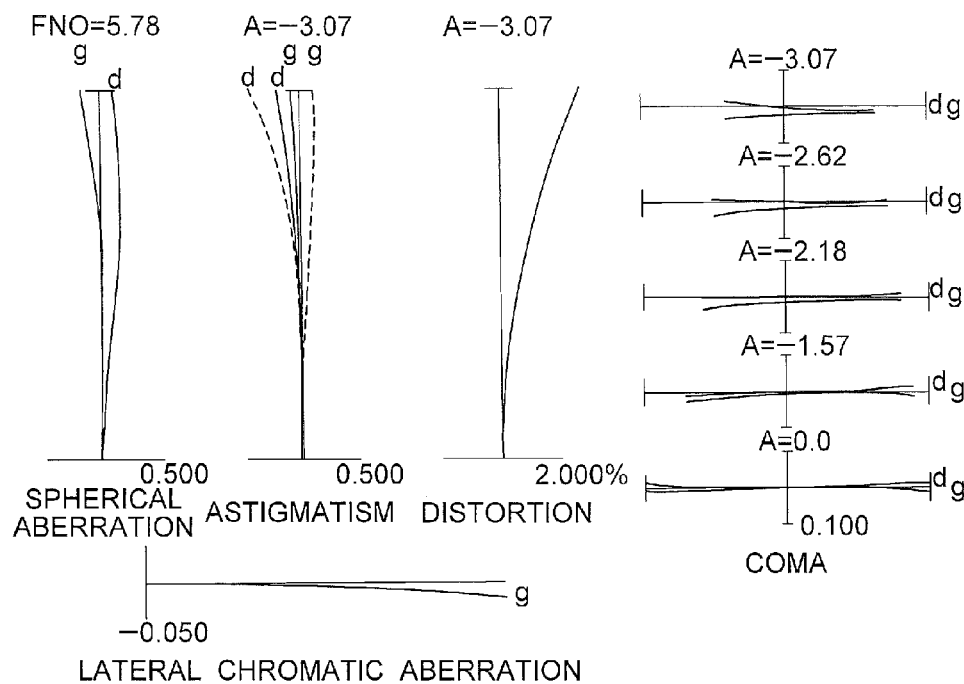
Figure 4B:
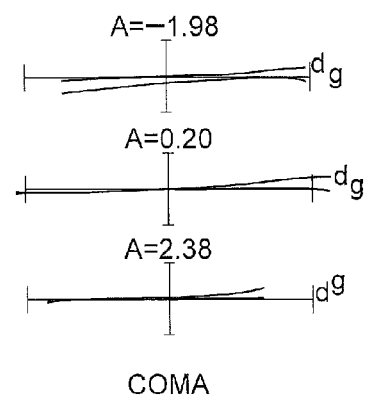

FIGS. 4A and 4B are graphs showing various aberrations of the zooming optical system according to the first Example in a telephoto end state upon focusing on infinity according to the first Example, in which FIG. 4A shows various aberrations upon focusing infinity, and FIG. 4B shows coma upon carrying out correction of rotational camera shake of 0.2° in a state focusing on infinity.

In each diagram showing various aberrations, FNO denotes an f-number, "A" denotes a half angle of view, "d" indicates an aberration curve with respect to d-line (wave length λ=587.6 nm), "g" indicates an aberration curve with respect to the g-line (wave length λ=435.6 nm). In graphs showing astigmatism, a solid line indicates a sagittal image plane, and a broken line indicates a meridional image plane. Note that the descriptions of these aberration diagrams are the same in the subsequent Examples.

As is apparent from the respective graphs showing aberrations, the zooming optical system relating to the first Example can correct well various aberrations and can attain superb imaging performance.

Second Example

FIG. 5 shows a lens configuration of the zoom optical system ZL2 relating to the second Example.

In the zoom optical system ZL2 shown in FIG. 5, the first lens group G1 is composed of, in order from the object side, a cemented negative lens constructed by a negative meniscus lens L11 having a convex surface facing the object side cemented with a double convex lens L12, a positive meniscus lens L13 having a convex surface facing to the object side, and a positive meniscus lens L14 having a convex surface facing the object side.

The second lens group G2 is composed of, in order from the object side, a cemented negative lens constructed by a double convex lens L21 cemented with a double concave lens L22, a cemented negative lens constructed by a double concave lens L23 cemented with a positive meniscus lens L24 having a convex surface facing the object side, and a double concave lens L25.

The third lens group G3 is composed of, in order from the object side, a double convex lens L31 and a cemented positive lens constructed by a double convex lens L32 cemented with a negative meniscus lens L33 having a concave surface facing the object side.

The fourth lens group G4 is composed of a negative meniscus lens L41 having a concave surface facing the object side.

The fifth lens group G5 is composed of, in order from the object side, an aperture stop S, a positive meniscus lens L51 having a convex surface facing the object side, a cemented positive lens constructed by a double convex lens L52 cemented with a negative meniscus lens L53 having a concave surface facing to the object side.

The sixth lens group G6 is composed of, in order from the object side, a cemented positive lens constructed by a negative meniscus lens L61 having a convex surface facing the object side cemented with a double convex lens L62, and a negative meniscus lens L63 having a concave surface facing the object side.

Various values associated with the second example are listed in Table 2 below.

TABLE 2

(Entire Specifications)

|      | W     | M     | T     |
|------|-------|-------|-------|
| f =  | 81.6  | 240.0 | 392.0 |
| FNO =| 4.59  | 4.96  | 5.77  |
| 2ω = | 29.6  | 10.0  | 6.1   |
| Y =  | 21.6  | 21.6  | 21.6  |
| TL = | 259.3 | 259.3 | 259.3 |

(Lens Data)

| m | r         | d     | vd    | nd      |
|---|-----------|-------|-------|---------|
| 1 | 335.544   | 2.500 | 32.35 | 1.85026 |
| 2 | 93.505    | 7.996 | 82.51 | 1.49782 |
| 3 | −1086.225 | 0.100 |       |         |
| 4 | 96.595    | 7.149 | 82.51 | 1.49782 |
| 5 | 2728.493  | 0.100 |       |         |

TABLE 2-continued

| | | | | |
|---|---|---|---|---|
| 6 | 88.859 | 7.036 | 82.51 | 1.49782 |
| 7 | 1101.814 | D1 | | |
| 8 | 1028.718 | 3.605 | 23.78 | 1.84666 |
| 9 | −72.545 | 2.000 | 63.37 | 1.61800 |
| 10 | 54.820 | 2.862 | | |
| 11 | −227.525 | 2.000 | 54.66 | 1.72916 |
| 12 | 40.357 | 3.253 | 22.79 | 1.80809 |
| 13 | 150.185 | 2.893 | | |
| 14 | −53.892 | 2.000 | 42.72 | 1.83481 |
| 15 | 136.842 | D2 | | |
| 16 | 141.465 | 4.145 | 54.66 | 1.72916 |
| 17 | −67.855 | 0.200 | | |
| 18 | 128.206 | 4.357 | 82.51 | 1.49782 |
| 19 | −60.471 | 2.000 | 25.45 | 2.00069 |
| 20 | −168.761 | D3 | | |
| 21 | −75.436 | 2.000 | 54.66 | 1.72916 |
| 22 | −170.623 | D4 | | |
| 23 | 0.000 | 2.000 | | Aperture stop S |
| 24 | 39.720 | 3.230 | 82.51 | 1.49782 |
| 25 | 107.621 | 4.538 | | |
| 26 | 84.859 | 4.750 | 52.30 | 1.51742 |
| 27 | −54.303 | 2.000 | 28.46 | 1.72825 |
| 28 | −156.848 | D5 | | |
| 29 | 125.494 | 2.000 | 46.62 | 1.81600 |
| 30 | 20.977 | 4.948 | 36.30 | 1.62004 |
| 31 | −39.213 | 2.487 | | |
| 32 | −30.042 | 2.000 | 40.76 | 1.88300 |
| 33 | −376.111 | BF | | |

(Lens Group Data)

| Lens Group | ST | focusing distance |
|---|---|---|
| G1 | 1 | 107.465 |
| G2 | 8 | −26.561 |
| G3 | 16 | 57.782 |
| G4 | 21 | −187.102 |
| G5 | 23 | 69.602 |
| G6 | 29 | −76.319 |

(Variable Distance Data)

| | W | M | T |
|---|---|---|---|
| D1 | 6.027 | 41.419 | 47.116 |
| D2 | 38.421 | 16.139 | 2.000 |
| D3 | 9.884 | 18.100 | 16.200 |
| D4 | 39.081 | 10.416 | 2.000 |
| D5 | 17.135 | 17.511 | 17.879 |
| BF | 64.6 | 71.5 | 89.9 |

(Vibration Reduction Data)

| | f | K | θ | Dvr |
|---|---|---|---|---|
| W | 81.6 | 0.80 | 0.3 | 0.53 |
| M | 240.0 | 0.87 | 0.2 | 0.98 |
| T | 392.0 | 1.05 | 0.2 | 1.30 |

(Values for Conditional Expressions)

(1) f1/f3 = 1.86
(2) (−f4)/f5 = 2.69
(3) f1/TLw = 0.42
(4) f2/TLw = 0.10
(5) f1/(−f2) = 4.05
(6) (−f2)/f3 = 0.46
(7) f4/f6 = 2.45
(8) f5/(−f6) = 0.91

Figure 6A:
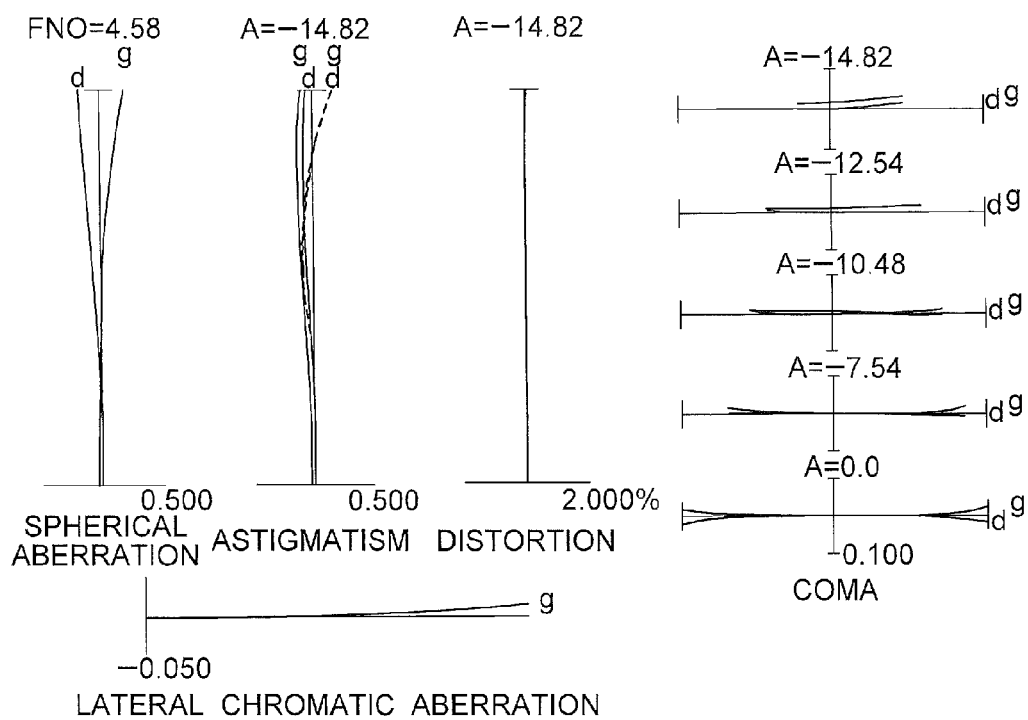
Figure 6B:
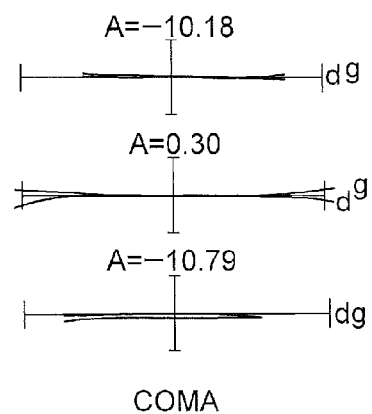

FIGS. 6A and 6B are graphs showing various aberrations of the zooming optical system relating to the second Example in a wide angle end state, in which FIG. 6A shows various aberrations upon focusing on infinity, and FIG. 6B shows coma upon carrying out correction of rotational camera shake of 0.3° in a state focusing on infinity.

Figure 7A:
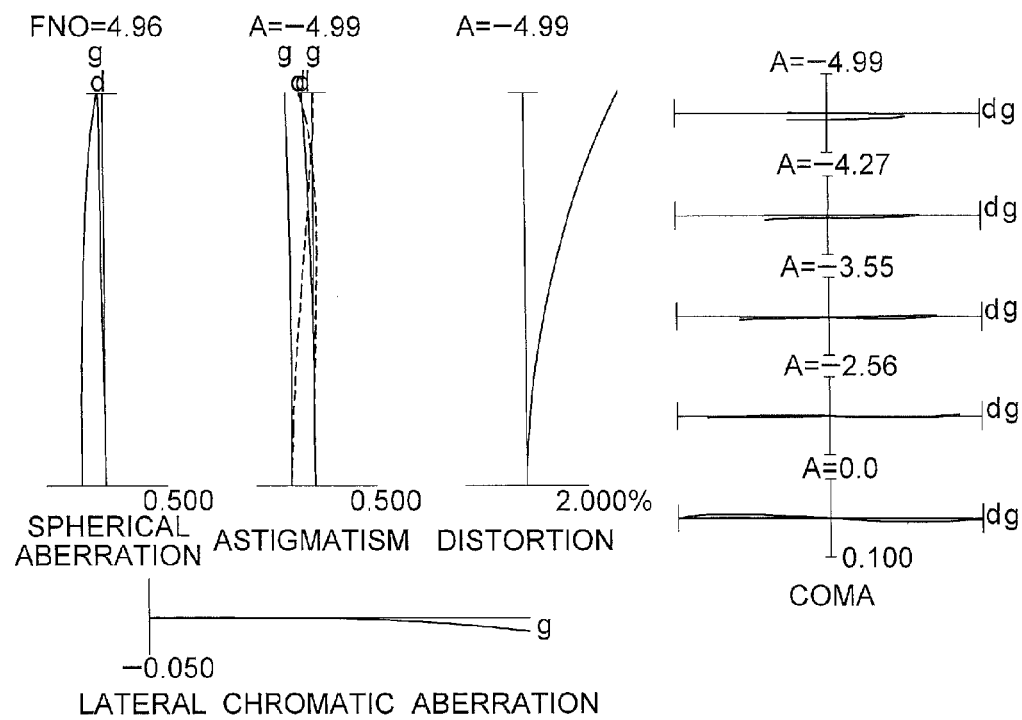
Figure 7B:
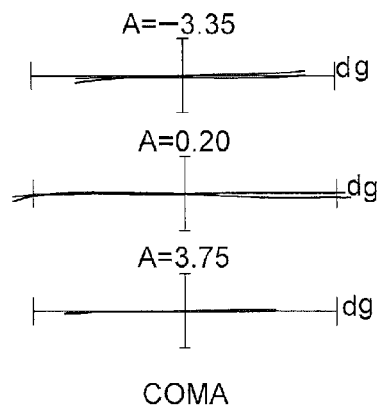

FIGS. 7A and 7B are graphs showing various aberrations of the zooming optical system relating to the second Example in an intermediate focal length state, in which FIG. 7A shows various aberrations upon focusing on infinity and FIG. 7B shows coma upon carrying out correction of rotational camera shake of 0.2° in a state focusing on infinity.

Figure 8A:
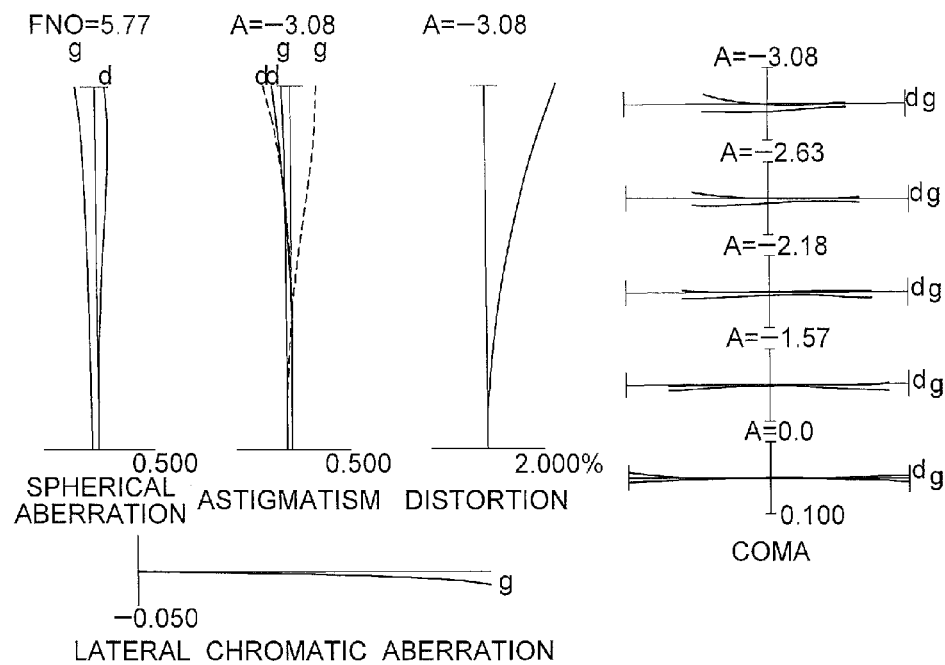
Figure 8B:
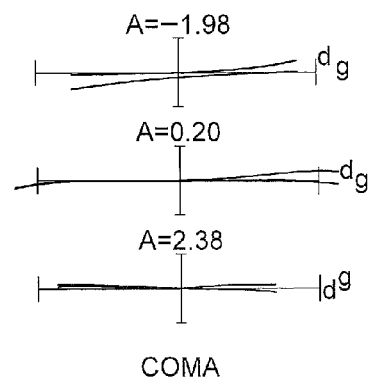

FIGS. 8A and 8B are graphs showing various aberrations of the zooming optical system according to the second Example in a telephoto end state upon focusing on infinity relating to the second Example, in which FIG. 8A shows various aberrations upon focusing infinity, and FIG. 8B shows coma upon carrying out correction of rotational camera shake of 0.2° in a state focusing on infinity.

As is apparent from the respective graphs showing aberrations, the zooming optical system according to the second Example can correct well various aberrations and can attain superb imaging performance.

Third Example

FIG. 9 shows a lens configuration of the zoom optical system ZL3 relating to the third Example.

In the zoom optical system ZL3 shown in FIG. 9, the first lens group G1 is composed of, in order from the object side, a cemented negative lens constructed by a negative meniscus lens L11 having a convex surface facing the object side cemented with a double convex lens L12, a positive meniscus lens L13 having a convex surface facing the object side, and a positive meniscus lens L14 having a convex surface facing the object side.

The second lens group G2 is composed of, in order from the object side, a cemented negative lens constructed by a positive meniscus lens L21 having a concave surface facing the object side cemented with a double concave lens L22, a cemented negative lens constructed by a double convex lens L23 cemented with a double concave lens L24, and a negative meniscus lens L25 having a concave surface facing the object side.

The third lens group G3 is composed of, in order from the object sire, a double convex lens L31 and a cemented negative lens constructed by a double convex lens L32 cemented with a negative meniscus lens L33 having a concave surface facing the object side.

The fourth lens group G4 is composed of a negative meniscus lens L41 having a concave surface facing the object side.

The fifth lens group G5 is composed of, in order from the object side, an aperture stop S, a cemented positive lens constructed by a negative meniscus lens L51 having a convex surface facing the object side cemented with a double convex lens L52, and a positive meniscus lens L53 having a convex surface facing the object side.

The sixth lens group G6 is composed of, in order from the object side, a cemented negative lens constructed by a double convex lens L61 cemented with a double concave lens L62, and a cemented positive lens constructed by a negative meniscus lens L63 having a convex surface facing the object side cemented with a positive meniscus lens L64 having a convex surface facing the object side, and a negative meniscus lens L65 having a concave surface facing the object side.

Various values associated with the third example are listed in Table 3 below.

TABLE 3

(Entire Specifications)

| | W | M | T |
|---|---|---|---|
| f = | 81.6 | 240.0 | 392.0 |
| FNO = | 4.59 | 5.00 | 5.77 |

TABLE 3-continued

| 2ω = | 29.6 | 10.0 | 6.1 |
|---|---|---|---|
| Y = | 21.6 | 21.6 | 21.6 |
| TL = | 283.6 | 283.6 | 283.6 |

(Lens Data)

| m | r | d | νd | nd |
|---|---|---|---|---|
| 1 | 320.893 | 2.500 | 31.27 | 1.90366 |
| 2 | 112.834 | 6.507 | 82.51 | 1.49782 |
| 3 | −3554.736 | 0.100 | | |
| 4 | 115.342 | 5.868 | 82.51 | 1.49782 |
| 5 | 1458.395 | 0.100 | | |
| 6 | 111.883 | 5.830 | 82.51 | 1.49782 |
| 7 | 1458.395 | D1 | | |
| 8 | −4213.036 | 2.473 | 23.78 | 1.84666 |
| 9 | −133.478 | 2.000 | 54.66 | 1.72916 |
| 10 | 59.984 | 1.578 | | |
| 11 | 128.930 | 4.222 | 23.78 | 1.84666 |
| 12 | −77.994 | 2.000 | 54.66 | 1.72916 |
| 13 | 77.642 | 4.034 | | |
| 14 | −57.953 | 2.000 | 47.38 | 1.78800 |
| 15 | −3369.986 | D2 | | |
| 16 | 130.165 | 6.000 | 54.66 | 1.72916 |
| 17 | −68.142 | 0.200 | | |
| 18 | 284.742 | 4.725 | 58.93 | 1.51823 |
| 19 | −50.235 | 2.000 | 29.37 | 1.95000 |
| 20 | −241.532 | D3 | | |
| 21 | −56.158 | 2.000 | 40.76 | 1.88300 |
| 22 | −110.578 | D4 | | |
| 23 | 0.000 | 2.000 | | Aperture stop S |
| 24 | 59.819 | 2.000 | 37.16 | 1.83400 |
| 25 | 40.409 | 7.114 | 64.11 | 1.51680 |
| 26 | −91.984 | 0.100 | | |
| 27 | 90.161 | 2.573 | 82.51 | 1.49782 |
| 28 | 904.396 | D5 | | |
| 29 | 110.032 | 2.314 | 25.43 | 1.80518 |
| 30 | −108.778 | 1.500 | 40.76 | 1.88300 |
| 31 | 55.519 | 22.382 | | |
| 32 | 58.247 | 1.500 | 40.76 | 1.88300 |
| 33 | 30.631 | 4.891 | 38.01 | 1.60342 |
| 34 | 598.923 | 5.810 | | |
| 35 | −34.467 | 1.500 | 40.76 | 1.88300 |
| 36 | −68.483 | BF | | |

(Lens Group Data)

| Lens Group | ST | focusing distance |
|---|---|---|
| G1 | 1 | 135.000 |
| G2 | 8 | −36.474 |
| G3 | 16 | 73.876 |
| G4 | 21 | −131.497 |
| G5 | 23 | 61.193 |
| G6 | 29 | −55.551 |

(Variable Distance Data)

| | W | M | T |
|---|---|---|---|
| D1 | 8.441 | 49.813 | 58.145 |
| D2 | 59.847 | 22.570 | 3.383 |
| D3 | 17.930 | 17.586 | 23.344 |
| D4 | 26.917 | 9.136 | 2.573 |
| D5 | 16.815 | 23.327 | 26.470 |
| BF | 45.8 | 53.4 | 61.9 |

(Vibration Reduction Data)

| | f | K | θ | Dvr |
|---|---|---|---|---|
| W | 81.6 | 0.80 | 0.3 | 0.53 |
| M | 240.0 | 0.89 | 0.2 | 0.95 |
| T | 392.0 | 0.98 | 0.2 | 1.39 |

(Values for Conditional Expressions)

(1) f1/f3 = 1.83
(2) (−f4)/f5 = 2.15
(3) f1/TLw = 0.48

TABLE 3-continued (4) f2/TLw = 0.13
(5) f1/(−f2) = 3.70
(6) (−f2)/f3 = 0.49
(7) f4/f6 = 2.37
(8) f5/(−f6) = 1.10

Figure 10A:
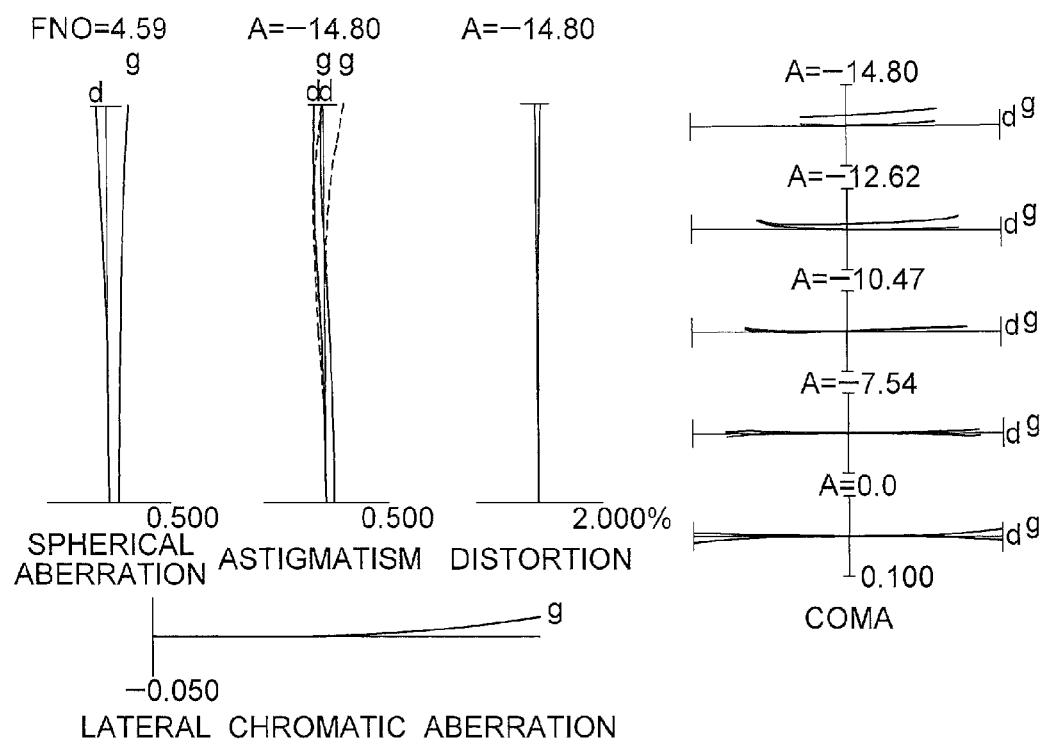
Figure 10B:
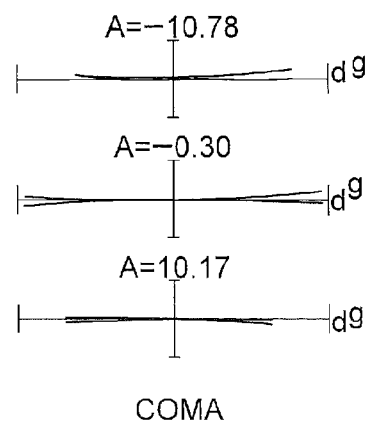

FIGS. 10A and 10B are graphs showing various aberrations of the zooming optical system relating to the third Example in a wide angle end state, in which FIG. 10A shows various aberrations upon focusing on infinity, and FIG. 10B shows coma upon carrying out correction of rotational camera shake of 0.3° in a state focusing on infinity.

Figure 11A:
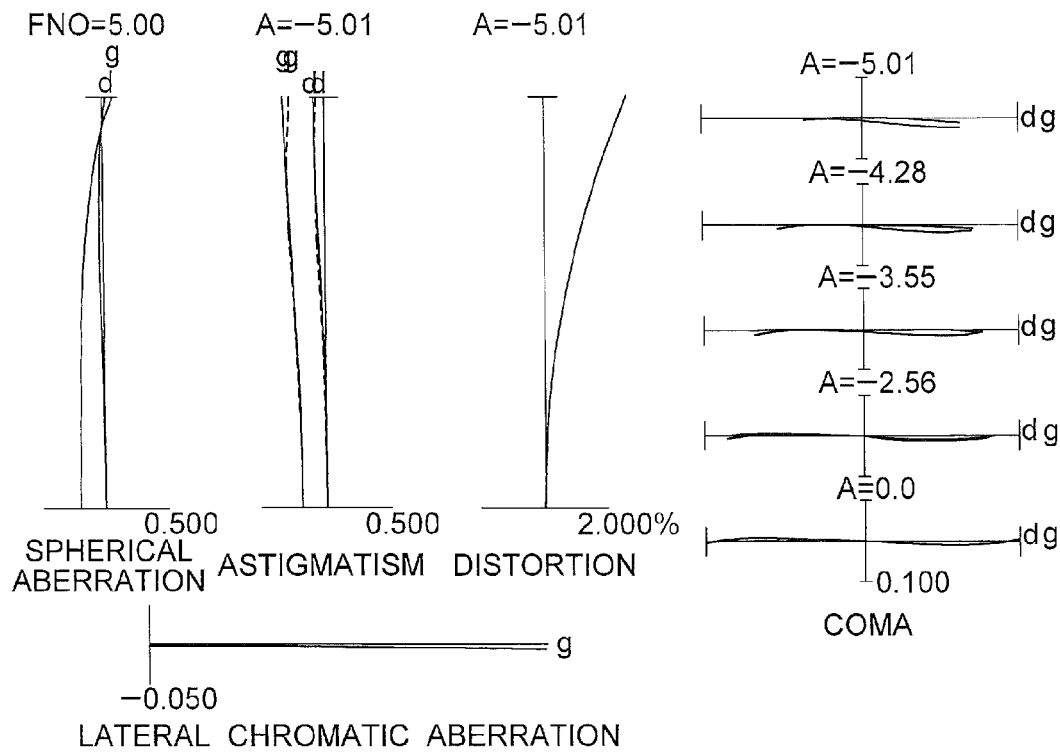
Figure 11B:
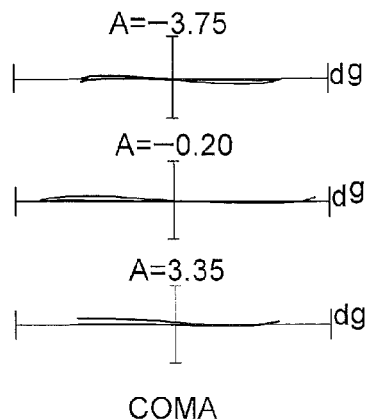

FIGS. 11A and 11B are graphs showing various aberrations of the zooming optical system relating to the third Example in an intermediate focal length state, in which FIG. 11A shows various aberrations upon focusing on infinity and FIG. 11B shows coma upon carrying out correction of rotational camera shake of 0.2° in a state focusing on infinity.

Figure 12A:
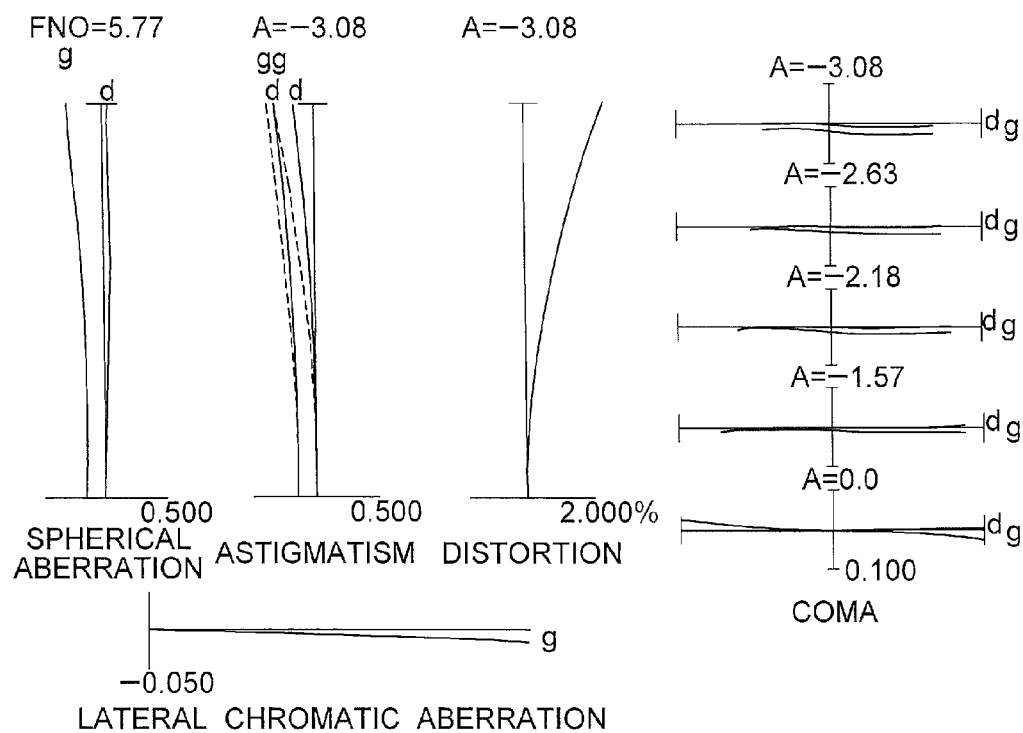
Figure 12B:
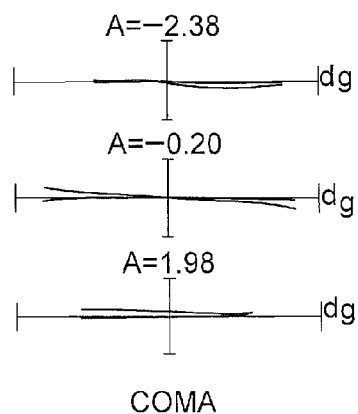

FIGS. 12A and 12B are graphs showing various aberrations of the zooming optical system according to the third Example in a telephoto end state upon focusing on infinity, in which FIG. 12A shows various aberrations upon focusing infinity, and FIG. 12B shows coma upon carrying out correction of rotational camera shake of 0.2° in a state focusing on infinity.

As is apparent from the respective graphs showing aberrations, the zooming optical system according to the third Example can correct well various aberrations and can attain superb imaging performance.

Figure 13:
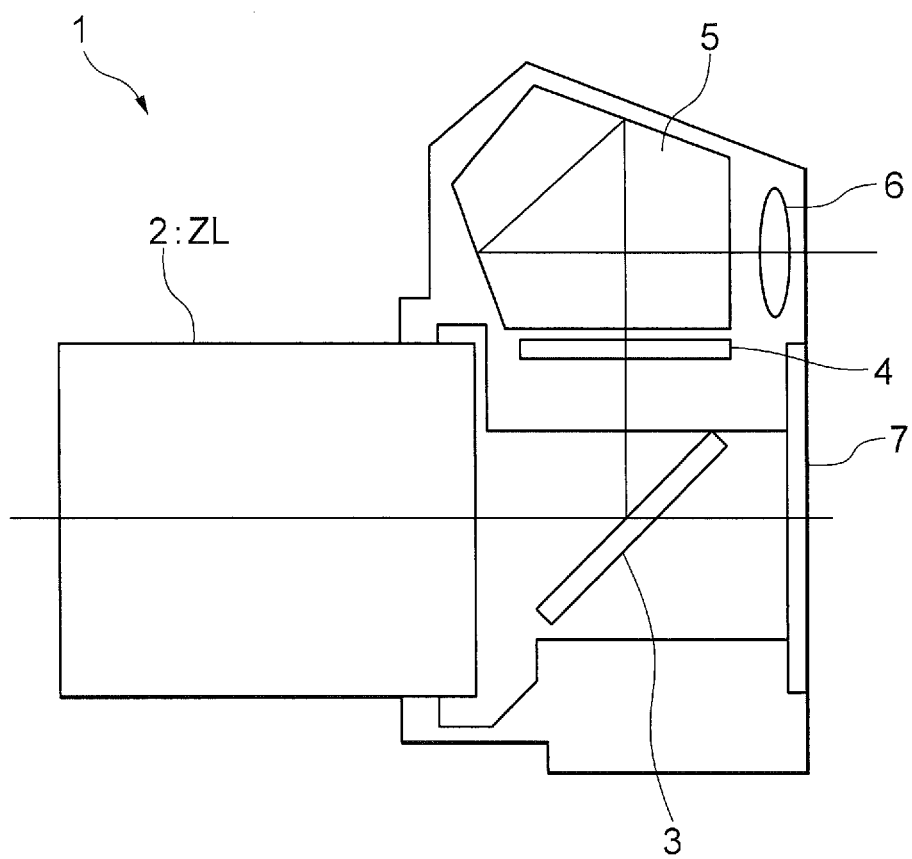
FIG. 13 is a sectional view showing a single lens reflex camera equipped with a zooming optical system according to the present embodiment.

FIG. 13 shows a schematic cross section of a single lens reflex camera 1 (hereinafter simply called as camera), as an optical apparatus equipped with the above described zoom lens system ZL.

In the camera 1, light rays coming out from an unillustrated object (object to be photographed) are converged by an imaging lens 2 (zooming optical system ZL), and focused, through a quick return mirror 3, on a focusing screen 4. The light rays focused on the focusing screen 4 are reflected a plurality of times in a pentagonal roof prism 5, and led to an eyepiece 6. Accordingly, a photographer can observe the object image as an erected image through the eyepiece 6.

When the photographer presses a release button (not shown), the quick return mirror 3 is retracted out of the optical path, the light rays from the object (object to be photographed) form an image of the object on an imaging device 7. Thus, the light rays from the object (object to be photographed) are captured by the imaging device 7 and stored in a memory (not shown) as an image of the object (object to be photographed). In this manner, the photographer can take a picture of an image of the object by the camera 1.

The camera 1 shown in FIG. 13 may be one that holds detachably the zoom optical system ZL, or one that is integrally equipped with the zoom optical system ZL. Further, the camera 1 may be a so-called single lens reflex camera. Furthermore, a camera, even if that is not equipped with a quick return mirror, can attain the same effects as the above mentioned camera.

Incidentally, the contents described hereinafter may be adopted, if needed, to the extent that optical performance is not deteriorated.

Although a zoom optical system ZL with a six-lens-group configuration is shown as each Example of the present application, other lens-group configurations such as a seven-lens group configuration is possible. More specifically, a lens or a lens group may be added to the most object side or image plane side of the zooming lens system according to the present application. Further, "a lens group" means at least one lens separated by air spaces that vary upon zooming or focusing, or separated to be movable in a direction including a component substantially perpendicular to the optical axis.

Further, a single lens group or a plurality of lens groups, or a portion of a lens group may be moved in the direction of the optical axis as a focusing lens group for focusing from an infinity object to a close object. In this case, such a focusing lens group is suitable for auto focusing, and is suitable for being driven by a motor for auto focusing such as an ultrasonic motor. In particular, it is preferable that the third lens group G3 is adopted as the focusing lens group in the present embodiment, as above described.

Further, a lens group or a portion of a lens group may be moved to have a component in a direction having a component perpendicular to the optical axis, or rotated (fluctuated) in a direction within a plane including the optical axis, as a vibration reduction lens group for correcting an image blur caused by a camera shake. It is particularly preferable that at least a portion of the fifth lens group G5 or of the sixth lens group G6 is used as a vibration reduction lens group.

A lens surface may be a spherical surface, a plane surface, or an aspherical surface. When a lens surface is a spherical surface without using an aspherical surface, as in the case of the zooming optical system according to the present embodiment, lens processing, assembling and adjustment become easy, and deterioration in optical performance caused by lens processing, assembling and adjustment errors can be prevented, so that it is preferable. Moreover, even if the image plane is shifted, deterioration in optical performance is little, so that it is preferable. When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

An antireflection coating having high transmittance over a broad wavelength range may be applied to each lens surface to reduce flare or ghost images, so that high optical performance with high contrast can be attained.

In a zoom lens system ZL according to the present embodiment, a zooming ratio is about 2.5 to 8.

Although the above description has been made with the structural requirements of the embodiment in order that the present application may be understood easily, it is needless to say that the present application is limited thereto.

What is claimed is:

1. A zooming optical system comprising, in order from an object side: a first lens group having positive refractive power; a second lens group having negative refractive power; a third lens group having positive refractive power; a fourth lens group having negative refractive power; a fifth lens group having positive refractive power; and a sixth lens group having negative refractive power;
   at least one lens group among said lens groups being moved such that a component in a direction perpendicular to the optical axis is included, and
   the zooming optical system satisfying the following conditional expressions:

$1.62 < f1/f3 < 2.23$ $1.71 < (-f4)/f5 < 2.99$ $0.08 < (-f2)/TLw < 0.15,$ where f1 denotes a focal length of the first lens group, f2 denotes a focal length of the second lens group, f3 denotes a focal length of the third lens group, f4 denotes a focal length of the fourth lens group, f5 denotes a focal length of the fifth lens group, and TLw denotes a total length in a wide angle end state.

2. The zooming optical system according to claim 1, wherein, upon zooming, a distance between the first lens group and the second lens group is varied, a distance between the second lens group and the third lens group is varied, a distance between the third lens group and the fourth lens group is varied, a distance between the fourth lens group and the fifth lens group is varied, and a distance between the fifth lens group and the sixth lens group is varied.

3. The zooming optical system according to claim 1, wherein the following conditional expression is satisfied:

$0.30 < f1/TLw < 0.60.$

4. The zooming optical system according to claim 1, wherein an aperture stop is disposed between said third lens group and said sixth lens group.

5. The zooming optical system according to claim 1, wherein, upon focusing, at least a portion of said third lens group is moved along the optical axis.

6. An optical apparatus equipped with a zooming optical system according to claim 1.

7. A zooming optical system comprising, in order from an object side: a first lens group having positive refractive power; a second lens group having negative refractive power; a third lens group having positive refractive power; a fourth lens group having negative refractive power; a fifth lens group having positive refractive power; and a sixth lens group having negative refractive power;
   upon zooming, the first lens group being fixed with respect to an image plane in the direction of the optical axis; and
   the zooming optical system satisfying the following conditional expressions:

$3.10 < f1/(-f2) < 5.00,$ $0.40 < (-f2)/f3 < 0.60,$ $2.00 < f4/f6 < 3.00,$ where f1 denotes a focal length of the first lens group, f2 denotes a focal length of the second lens group, f3 denotes a focal length of the third lens group, f4 denotes a focal length of the fourth lens group, and f6 denotes a focal length of the sixth lens group.

8. The zooming optical system according to claim 7, wherein, upon zooming, a distance between the first lens group and the second lens group is varied, a distance between the second lens group and the third lens group is varied, a distance between the third lens group and the fourth lens group is varied, a distance between the fourth lens group and the fifth lens group is varied, and a distance between the fifth lens group and the sixth lens group is varied.

9. The zooming optical system according to claim 7, wherein the following conditional expression is satisfied:

$0.66 < f5/(-f6) < 1.50,$ where f5 denotes a focal length of the fifth lens group, and f6 denotes a focal length of the sixth lens group.

10. The zooming optical system according to claim 7, wherein an aperture stop is disposed between said third lens group and said sixth lens group.

11. The zooming optical system according to claim 7, wherein, upon focusing, at least a portion of any one lens group among said lens groups is moved such that a component in a direction perpendicular to the optical axis is included.

12. The zooming optical system according to claim 7, wherein, upon focusing, at least a portion of said third lens group is moved along the optical axis.

13. An optical apparatus equipped with a zooming optical system according to claim 7.

14. A method for manufacturing a zoom optical system that comprises, in order from an object side, a first lens group having positive refractive power, a second lens group having negative refractive power, a third lens group having positive refractive power, a fourth lens group having negative refractive power, a fifth lens group having positive refractive power, and a sixth lens group having negative refractive power,
the method comprising:
disposing at least a portion of any one lens group among said lens groups to be movable in a direction including a component perpendicular to the optical axis, and
the following conditional expressions being satisfied:

$$1.62 < f1/f3 < 2.23$$

$$1.71 < (-f4)/f5 < 2.99$$

$$0.08 < (-f2)/TLw < 0.15,$$

where f1 denotes a focal length of the first lens group, f2 denotes a focal length of the second lens group, f3 denotes a focal length of the third lens group, f4 denotes a focal length of the fourth lens group, f5 denotes a focal length of the fifth lens group, and TLw denotes a total length in a wide angle end state.

15. A method for manufacturing a zoom optical system that comprises, in order from an object side, a first lens group having positive refractive power, a second lens group having negative refractive power, a third lens group having positive refractive power, a fourth lens group having negative refractive power, a fifth lens group having positive refractive power, and a sixth lens group having negative refractive power,
the method comprising:
disposing lens groups such that, upon zooming, said first lens group is fixed with respect to an image plane in the direction of the optical axis; and
disposing lens groups such that the following conditional expressions are satisfied:

$$3.10 < f1/(-f2) < 5.00,$$

$$0.40 < (-f2)/f3 < 0.60,$$

$$2.00 < f4/f6 < 3.00,$$

where f1 denotes a focal length of said first lens group, f2 denotes a focal length of the second lens group, f3 denotes a focal length of the third lens group, f4 denotes a focal length of the fourth lens group, and f5 denotes a focal length of the sixth lens group.

16. A zooming optical system comprising, in order from an object side: a first lens group having positive refractive power; a second lens group having negative refractive power; a third lens group having positive refractive power; a fourth lens group having negative refractive power; a fifth lens group having positive refractive power; and a sixth lens group having negative refractive power;
at least one lens group among said lens groups being moved such that a component in a direction perpendicular to the optical axis is included;
upon zooming, said first lens group is fixed with respect to the image plane in the direction of the optical axis; and
the zooming optical system satisfying the following conditional expressions:

$$1.62 < f1/f3 < 2.23$$

$$1.71 < (-f4)/f5 < 2.99$$

where f1 denotes a focal length of the first lens group, f3 denotes a focal length of the third lens group, f4 denotes a focal length of the fourth lens group, and f5 denotes a focal length of the fifth lens group.

17. A method for manufacturing a zoom optical system that comprises, in order from an object side, a first lens group having positive refractive power, a second lens group having negative refractive power, a third lens group having positive refractive power, a fourth lens group having negative refractive power, a fifth lens group having positive refractive power, and a sixth lens group having negative refractive power,
the method comprising:
disposing at least a portion of any one lens group among said lens groups to be movable in a direction including a component perpendicular to the optical axis; and
disposing lens groups such that, upon zooming, said first lens group may fixed with respect to the image plane in the direction of the optical axis, and
the following conditional expressions being satisfied:

$$1.62 < f1/f3 < 2.23,$$

$$1.71 < (-f4)/f5 < 2.99,$$

where f1 denotes a focal length of the first lens group, f3 denotes a focal length of the third lens group, f4 denotes a focal length of the fourth lens group, f5 denotes a focal length of the fifth lens group.

18. The zooming optical system according to claim 16, wherein, upon zooming, a distance between the first lens group and the second lens group is varied, a distance between the second lens group and the third lens group is varied, a distance between the third lens group and the fourth lens group is varied, a distance between the fourth lens group and the fifth lens group is varied, and a distance between the fifth lens group and the sixth lens group is varied.

19. The zooming optical system according to claim 16, wherein the following conditional expression is satisfied:

$$0.30 < f1/TLw < 0.60,$$

where TLw denotes a total length in a wide angle end state.

20. The zooming optical system according to claim 16, wherein an aperture stop is disposed between said third lens group and said sixth lens group.

21. The zooming optical system according to claim 16, wherein, upon focusing, at least a portion of said third lens group is moved along the optical axis.

22. An optical apparatus equipped with a zooming optical system according to claim 16.

* * * * *